(12) United States Patent
Stevenson et al.

(10) Patent No.: US 10,953,572 B2
(45) Date of Patent: Mar. 23, 2021

(54) FLEXIBLE HEAT TRANSFER DIE COMPRISING A THERMAL INTERFACE MATERIAL

(71) Applicant: POLYFUZE GRAPHICS CORPORATION, Clarkdale, AZ (US)

(72) Inventors: Michael J. Stevenson, Sedona, AZ (US); Robert A. Reeves, Flagstaff, AZ (US); Corey R. Dibrom, Cottonwood, AZ (US); Darren Gemmill, Clarkdale, AZ (US)

( * ) Notice: Subject to any disclaimer, the term of this patent is extended or adjusted under 35 U.S.C. 154(b) by 0 days.

(21) Appl. No.: 16/933,214

(22) Filed: Jul. 20, 2020

(65) Prior Publication Data

US 2020/0346374 A1 Nov. 5, 2020

Related U.S. Application Data

(60) Continuation of application No. 16/879,439, filed on May 20, 2020, now Pat. No. 10,737,414, which is a
(Continued)

(51) Int. Cl.
*B29C 37/00* (2006.01)
*B41M 5/00* (2006.01)
(Continued)

(52) U.S. Cl.
CPC ......... *B29C 37/0028* (2013.01); *B41M 5/025* (2013.01); *B29C 2037/0046* (2013.01);
(Continued)

(58) Field of Classification Search
CPC ... B29C 37/00; B29C 37/002; B29C 37/0028;
B29C 2037/00; B29C 2037/004; B29C 2037/0046; B41M 5/00; B41M 5/02; B41M 5/025; B29K 2219/00; B29K 2227/00; B29K 2227/10; B29K 2227/18; B29K 2265/00; B29K 2279/00; B29K 2279/08;
(Continued)

(56) References Cited

U.S. PATENT DOCUMENTS

| 4,465,728 A | 8/1984 | Haigh et al. |
| 4,658,721 A | 4/1987 | Mathis |

(Continued)

OTHER PUBLICATIONS

ISA; International Search Report and Written Opinion dated May 7, 2020 in Application No. PCT/US2020/017992.
(Continued)

*Primary Examiner* — Jacob T Minskey
*Assistant Examiner* — Matthew Hoover
(74) *Attorney, Agent, or Firm* — Snell & Wilmer L.L.P.

(57) ABSTRACT

Methods, apparatus and system for decorating plastic articles having an uneven surface or hollow structure are disclosed. An assembly comprising a transfer pad and a flexible heat transfer die comprising a thermal interface material (TIM) replace the hard rubber die in a hot-stamping process to fuse indicia into the surface. The assembly modifies ordinary pad printing into a hot-stamping process that transfers indicia onto uneven surfaces. A pad printing machine or other robotics is used to move the assembly from a position of heating to a position of compressing the ink transfer to the surface of the article.

13 Claims, 10 Drawing Sheets

Figure 1A:
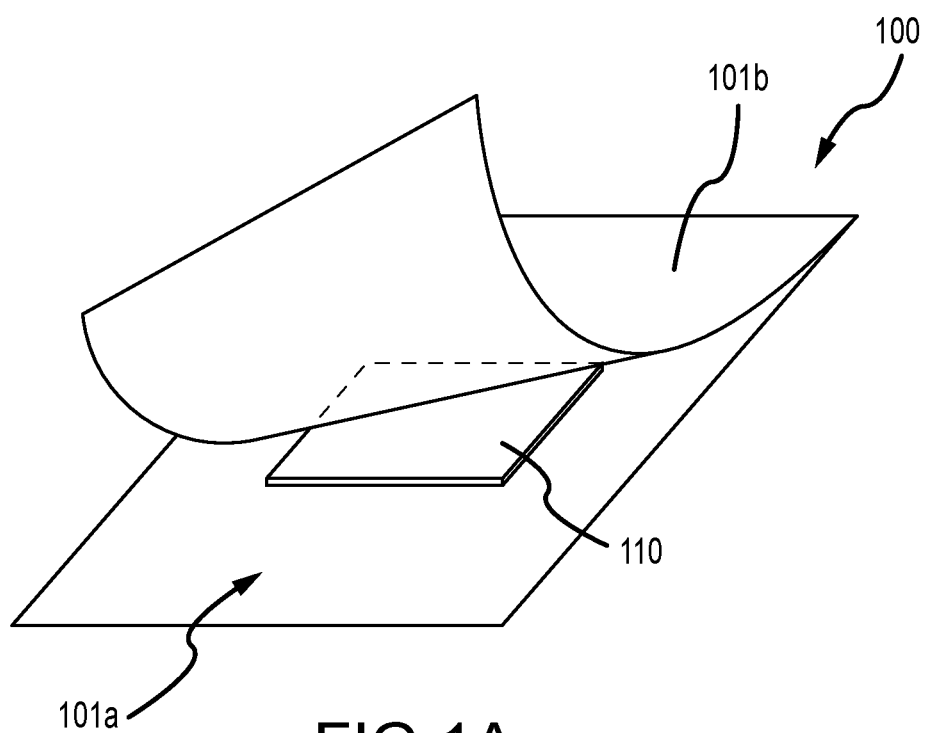

Related U.S. Application Data division of application No. 16/789,281, filed on Feb. 12, 2020, now Pat. No. 10,737,413.

(60) Provisional application No. 62/805,143, filed on Feb. 13, 2019.

(51) Int. Cl.
*B41M 5/025* (2006.01)
*B29L 31/00* (2006.01)
*B29K 219/00* (2006.01)
*B29K 227/18* (2006.01)
*B29K 279/00* (2006.01)

(52) U.S. Cl.
CPC ...... *B29K 2219/00* (2013.01); *B29K 2227/18* (2013.01); *B29K 2265/00* (2013.01); *B29K 2279/08* (2013.01); *B29L 2031/722* (2013.01)

(58) Field of Classification Search
CPC ............. B29L 2031/00; B29L 2031/70; B29L 2031/72; B29L 2031/722
See application file for complete search history.

(56) References Cited

U.S. PATENT DOCUMENTS

| | | | |
|---|---|---|---|
| 5,142,722 A | 9/1992 | Kolb | |
| 5,878,670 A | 3/1999 | Yamaguchi | |
| 7,622,171 B2 * | 11/2009 | Laprade | B32B 27/10 |
| | | | 428/32.79 |
| 8,349,917 B2 * | 1/2013 | Stevenson | B41M 3/12 |
| | | | 523/160 |
| 9,296,243 B2 * | 3/2016 | Stevenson | B41M 3/12 |
| 2002/0148054 A1 | 10/2002 | Drake | |
| 2004/0118508 A1 | 6/2004 | Widman | |
| 2006/0283555 A1 | 12/2006 | Green | |

OTHER PUBLICATIONS

USPTO; Notice of Allowance dated Jun. 30, 2020 in U.S. Appl. No. 16/879,439.
USPTO; Restriction Requirement Office Action dated Apr. 15, 2020 in U.S. Appl. No. 16/789,281.
USPTO; Notice of Allowance dated Jun. 17, 2020 in U.S. Appl. No. 16/789,281.
ISA; International Preliminary Report on Patentability dated Sep. 3, 2020 in Application No. PCT/US2020/017992.

* cited by examiner

FLEXIBLE HEAT TRANSFER DIE COMPRISING A THERMAL INTERFACE MATERIAL

CROSS-REFERENCE TO RELATED APPLICATIONS

This application is a continuation of, claims priority to and the benefit of, U.S. Ser. No. 16/879,439 filed May 20, 2020 and entitled "METHODS AND SYSTEMS FOR DECORATING MOLDED PLASTIC ARTICLES HAVING UNEVEN SURFACES OR HOLLOW STRUCTURES." The '439 application is a divisional of, claims the priority to and the benefit of, U.S. Ser. No. 16/789,281 filed Feb. 12, 2020 and entitled "Methods and Systems for Decorating Molded Plastic Articles Having Uneven Surfaces or Hollow Structures." The '281 application claims priority to and the benefit of U.S. Provisional Patent Application Ser. No. 62/805,143 filed Feb. 13, 2019 and entitled "Methods and Systems for Decorating Plastic Articles Having Uneven Surfaces or Hollow Structures." Each of these disclosures are incorporated herein by reference in their entirety for all purposes.

FIELD

This disclosure generally relates to decorating molded plastic articles with a printed ink thermal transfer in a hot-stamping process, and more specifically, to methods and systems for decorating molded plastic articles having uneven surfaces, texturing, hollow structures or crushable structures.

BACKGROUND

A large variety of articles are manufactured from polyolefin plastic through a variety of methods such as, for example, injection molding, rotational molding, blow molding, and/or thermoforming. Although molding various polyolefin plastic articles may be relatively straightforward, permanently decorating the articles is challenging. In general, polyethylene and polypropylene plastics are non-polar, and resist adhesive coatings that could be used to mark the articles with decorative indicia.

Attempts to improve adhesion of labels to untreated plastic surfaces have included the use of heat activated labels, such as disclosed in U.S. Pat. No. 7,622,171. These labels are applied to the plastic articles in the form of transfers having an adhesive layer comprising a vinyl acetate resin, a tackifying resin, and a microcrystalline wax. However, this approach adhesively bonds the label only to the outer surface of the article. In other words, the label applied in this way is not part of the plastic, not integral to the article, but instead is attached on the surface of the plastic article where the label becomes subject to wear and eventual delamination.

U.S. Pat. Nos. 8,349,917 and 9,296,243 teach a thermal printing ink transfer made by fusing a polyethylene-based ink onto a carrier sheet or film. Transferring the indicia from the thermal printing ink transfer to a surface of a molded plastic article comprises heating the ink transfer to a temperature of about 450° F. (232° C.) to about 650° F. (343° C.) and compressing the transfer against the plastic article at a pressure of about 500 psig (3.45 MPa) to about 1000 psig (6.9 MPa). The heating and compressing are accomplished, for example, by forcing a heated flat metal plate (i.e., a heated platen) having a hard and thin rubber die against the article, while the printing ink transfer is indexed into position between the platen and the article. With this process, indicia are fused into the surface of the plastic article, becoming integral with the article.

Although the process disclosed in the '917 and '243 patents may be effective in decorating flat surfaces of plastic articles capable of withstanding the high pressure of the platen, the process is typically ineffective for decorating a surface that is not flat, or for decorating a surface of a plastic article not capable of withstanding the pressure of the platen (e.g., a plastic article having a hollow structure, or raised texturing, or other structure that would be readily crushed or damaged by the pressure of the platen). The heated press assembly comprising the platen and the hard rubber die is entirely inflexible and is incapable of conforming to uneven surfaces.

In view of these deficiencies, new methods, apparatus and systems for transferring indicia onto uneven surfaces and onto flat or uneven surfaces of fragile plastic articles are still needed.

SUMMARY

New methods, apparatus and systems for decorating molded plastic articles having uneven surfaces, surfaces over hollow structures or otherwise crushable structures are disclosed herein. The methods, apparatus and systems disclosed herein comprise adaptations of the processes disclosed in U.S. Pat. Nos. 8,349,917 and 9,296,243, which are hereby incorporated by reference in their entireties for all purposes. In particular, the heated platen and thin, hard rubber die that facilitate the transfer of indicia are replaced by a flexible heat transfer die capable of conforming the indicia transfer to uneven surfaces.

In various embodiments, a flexible heat transfer die comprises an externally heated flexible heat transfer die, an internally heated flexible heat transfer die, or an integrated flexible heat transfer die. In various embodiments, an integrated flexible heat transfer die is also externally heated.

In various embodiments, a flexible heat transfer die comprises: a portion of thermal interface material (TIM); and, at least one reinforcement material in contact with the TIM. In various embodiments, the reinforcement material dimensionally constrains the TIM portion in at least two directions. In various embodiments, the flexible heat transfer die further comprises an electrical heater disposed in contact with, or in close proximity to the TIM.

In various embodiments, a reinforcement material for use in a flexible heat transfer die comprises any combination of fabric, silicone rubber pad, cured elastomeric polymer, RTV silicone adhesive, Kapton® (polyimide) film, or Teflon® (polytetrafluoroethylene) film.

In various embodiments, a flexible heat transfer die comprises a sheet or other dimensionally trimmed or molded portion of TIM laminated between two layers of fabric reinforcement. The reinforced fabric laminated on both sides of the TIM dimensionally contains the soft and malleable TIM and protects it for hundreds to thousands of repeated hot-stamping events.

In various embodiments, a flexible heat transfer die comprises a sheet or other portion of TIM laminated between two layers of Kapton® or Teflon® film reinforcement. The film adhered to both sides of the TIM dimensionally contains the soft and malleable TIM and protects it for hundreds to thousands of repeated hot-stamping events.

In various embodiments, a flexible heat transfer die comprises a sheet or other portion of TIM laminated between a layer of Kapton® or Teflon® film and a layer of fabric reinforcement. Either the Kapton® or Teflon® film or the layer of fabric reinforcement may be on the side of the TIM that will be involved in the hot-stamping indicia transfer process. The film and the fabric adhered to opposite sides of the TIM dimensionally contains the soft and malleable TIM and protects it for hundreds to thousands of repeated hot-stamping events.

In various embodiments, a flexible heat transfer die comprises a sheet or other portion of TIM surrounded along its periphery by a silicone rubber pad. The silicone rubber pad dimensionally contains the soft and malleable TIM for hundreds to thousands of repeated hot-stamping events. In various embodiments, the TIM may be further supported on one or both faces by a layer of RTV vulcanized silicone rubber, a layer of reinforced fabric and/or a layer of Kapton® or Teflon® film.

In various embodiments, a flexible heat transfer die comprises a silicone rubber pad further comprising a window cut therein, wherein the window is filled with cure in place thermally conductive elastomeric gel that is later cured into the TIM portion. The silicone rubber pad dimensionally contains the soft and malleable TIM for hundreds to thousands of repeated hot-stamping events. In various embodiments, one side of the filled window is filled in with a layer of RTV vulcanized silicone rubber, or covered with a layer of RTV vulcanized silicone rubber, a layer of reinforced fabric and/or a layer of Kapton® or Teflon® film for further support to one side of the TIM. The other side of the cured TIM may be left open faced or covered with a layer of RTV vulcanized silicone rubber, a layer of reinforced fabric and/or a layer of Kapton® or Teflon® film.

In various embodiments, a flexible heat transfer die comprises a silicone rubber pad further comprising indicia engraved into the silicone rubber pad in the form of recesses, wherein the recesses are filled in with curable TIM that is later cured. In various embodiments, the recesses go all the way through the thickness of the silicone rubber pad, and a layer of RTV vulcanized silicone rubber, a layer of reinforced fabric and/or a layer of Kapton® or Teflon® film can be used on the backside of the filled-in recesses for support. In various embodiments, the recesses do not go through the thickness of the silicone rubber pad and no additional support is needed on the backside. The other side of the cured TIM may be left open faced or covered with a layer of RTV vulcanized silicone rubber, a layer of reinforced fabric and/or a layer of Kapton® or Teflon® film.

In various embodiments, a flexible heat transfer die further comprises at least one section of thin silicone rubber sheeting formed (e.g., cut) into a shape to mask the transfer of heat from portions of the TIM. For example, silicone rubber sheeting may be used to dimensionally shrink the usable footprint of the TIM, so that the heat is only transferred from the TIM to those portions of the printed ink transfer that carry printed indicia. In various embodiments, the silicone sheeting is cut to a shape that follows the outer boundaries of indicia. In this way, thin silicone rubber sheets reduce the visibility of the witness line by shrinking the periphery of it to closely follow the outer perimeter of the indicia design.

In various embodiments, the reinforced fabric, the silicone rubber pad and/or the Kapton® or Teflon® film of a flexible heat transfer die dimensionally extends the TIM portion of the die with relatively inexpensive materials so that the flexible heat transfer die can be draped around and fastened to another article such as an ink transfer pad common to a pad printing machine.

In various embodiments, a flexible heat transfer die is attached as a cover around an ink transfer pad of a pad printing machine such that the transfer pad can assist in conforming the flexible heat transfer die under pressure onto an uneven surface of the plastic article to be decorated, along with assisting in evacuating all the trapped air out from between the ink transfer and the plastic article without crushing the plastic article or any texturing present on the article.

In various embodiments, a flexible heat transfer die further includes a flexible electrical heater, e.g., a silicone heating blanket, disposed in contact with, or in close proximity to, a portion of TIM. In various embodiments, such an internally heated flexible heat transfer die is also attached as a cover around an ink transfer pad of a pad printing machine such that the transfer pad can assist in conforming the flexible heat transfer die onto an uneven surface of the plastic article to be decorated.

In various embodiments, a flexible heat transfer die comprises an ink transfer pad for a pad printing machine. In some instances, a transfer pad is molded entirely out of TIM rather than molded out of silicone rubber that is thermally non-conductive. In this way, the entire transfer pad becomes a heat transfer die because it comprises TIM.

In various embodiments, an integrated flexible heat transfer die comprises a cured elastomeric polymer at least partially encasing a portion of thermal interface material (TIM). In various examples, an integrated heat transfer die comprises a portion of TIM molded substantially inside a silicone rubber or other elastomeric transfer pad, so that just the bottom or "contact" portion of the TIM that will contact the thermal printed ink transfer is exposed. In other embodiments, a recess is etched into a transfer pad, such as by laser ablation of a portion of the bottom of the block of silicone rubber, and the recess filled in with curable TIM to make a flexible integrated heat transfer die. In various embodiments, an integrated heat transfer die comprises a version of the flexible heat transfer die in that the reinforcing material, the silicone rubber or other elastomer, is in contact with and confines the TIM portion of the heat transfer die thus acting as the reinforcing material in the die. The integrated heat transfer die is "flexible" in that it deforms when pressed against an object to be decorated.

In various embodiments, a flexible heat transfer die as described herein is used with a thermal printed ink transfer disclosed in U.S. Pat. Nos. 8,349,917 and 9,296,243 in a "single-cycle" process wherein the flexible heat transfer die is pressed against the article to be decorated with the printed ink transfer positioned between the flexible heat transfer die and the plastic article.

In various embodiments, a flexible heat transfer die as described herein is used with a printed ink transfer disclosed in U.S. Pat. Nos. 8,349,917 and 9,296,243 in a "dual-cycle" process wherein the flexible heat transfer die is used in a first step to move the indicia from the printed ink transfer to the article to be decorated, and then, after the carrier sheet of the transfer is peeled off the indicia on the article, the flexible heat transfer die is used in a second step to fuse the indicia into the surface of the article. The dual-cycle process may be conducted at lower temperatures than the single-cycle process because the fusion step is not hindered by the stiff and insulative carrier sheet of the transfer.

In various embodiments, a flexible heat transfer die that is externally heated is used in a modified pad printing machine where it is draped around the ink transfer pad, and wherein the machine first moves the draped pad over to a heat source to absorb heat into the flexible heat transfer die prior to moving the draped pad down onto a molded plastic article while an indicia transfer is positioned between the draped pad and the article to be decorated.

In various embodiments, an integrated flexible heat transfer die that is externally heated is used in a modified pad printing machine wherein the apparatus first moves the integrated flexible heat transfer die over to a heat source to absorb heat into the TIM portion of the integrated flexible heat transfer die, prior to moving the integrated flexible heat transfer die down onto a molded plastic article while an indicia transfer is positioned between the integrated flexible heat transfer die and the article to be decorated.

In various embodiments, a flexible heat transfer die that is internally heated is used in an apparatus where it is draped around the transfer pad in the same way as an externally heated flexible heat transfer die, and wherein the simplified apparatus may comprise an ordinary press that moves the draped transfer pad down onto a molded plastic article while an indicia transfer is positioned between the draped transfer pad and the article to be decorated.

BRIEF DESCRIPTION OF THE DRAWING FIGURES

Figure 1B:
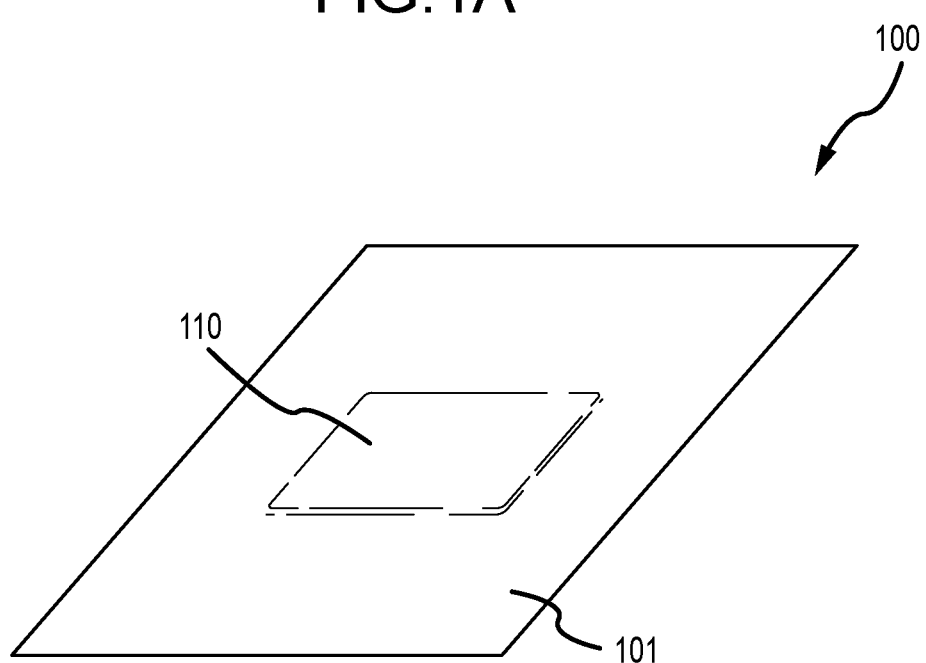
Figure 2A:
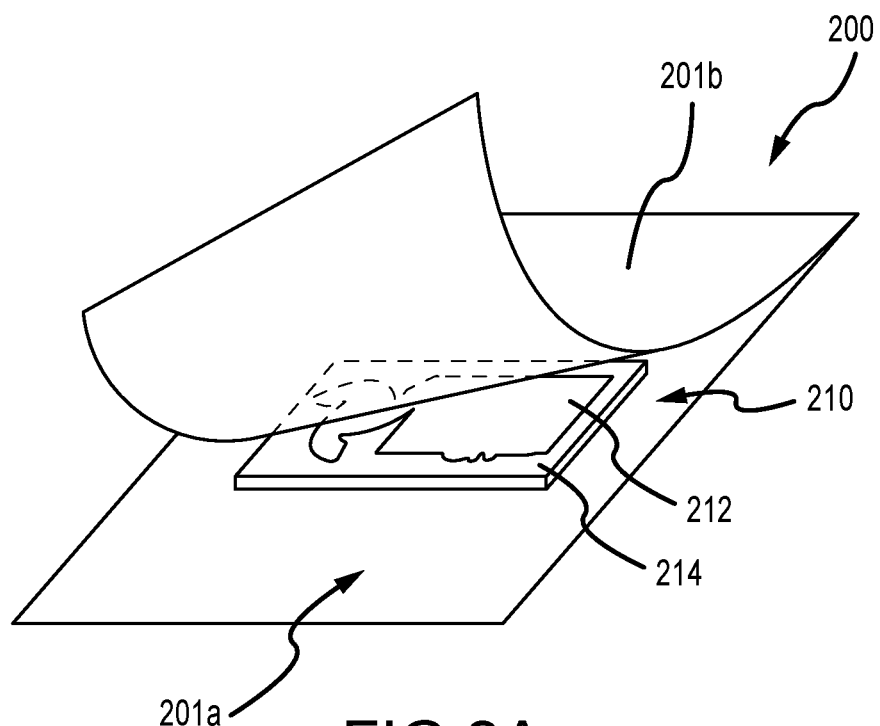
Figure 2B:
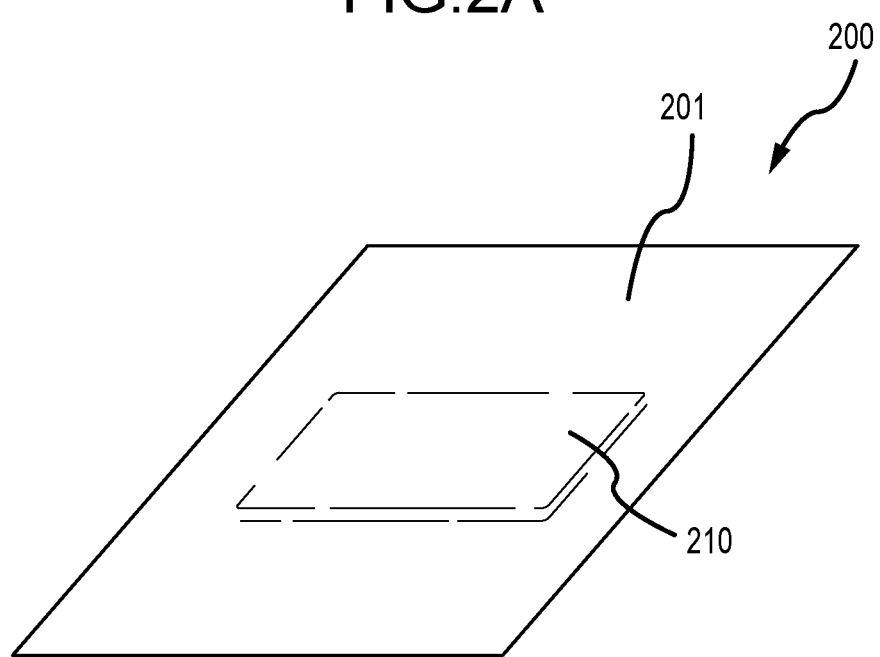
Figure 3:
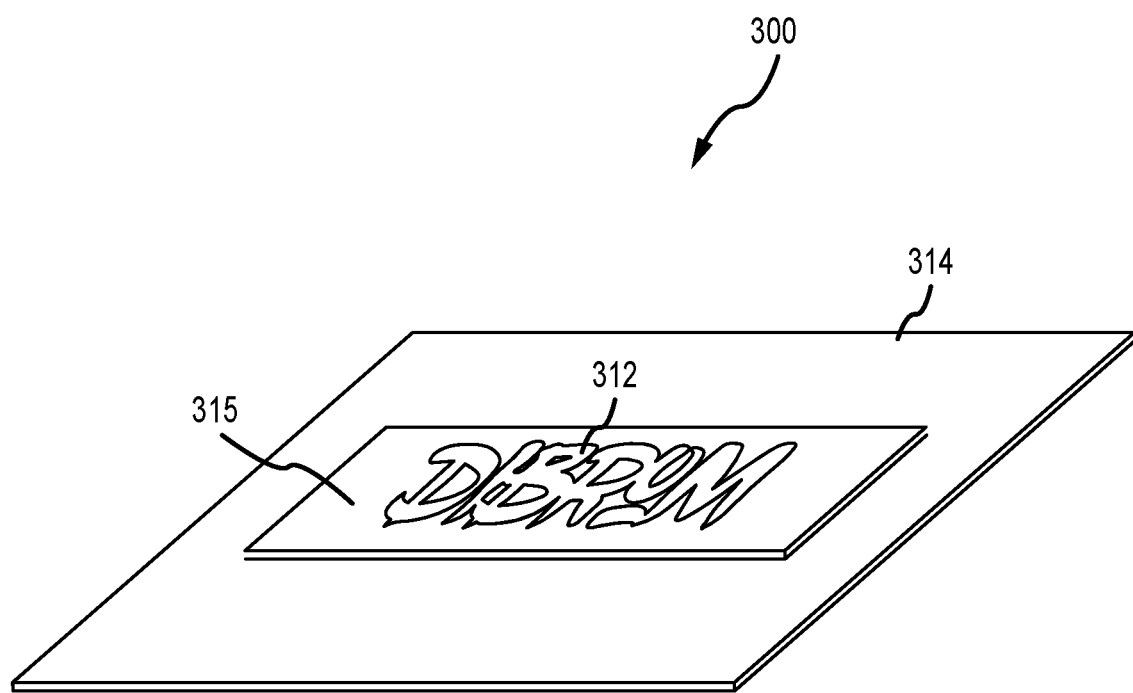
Figure 4:
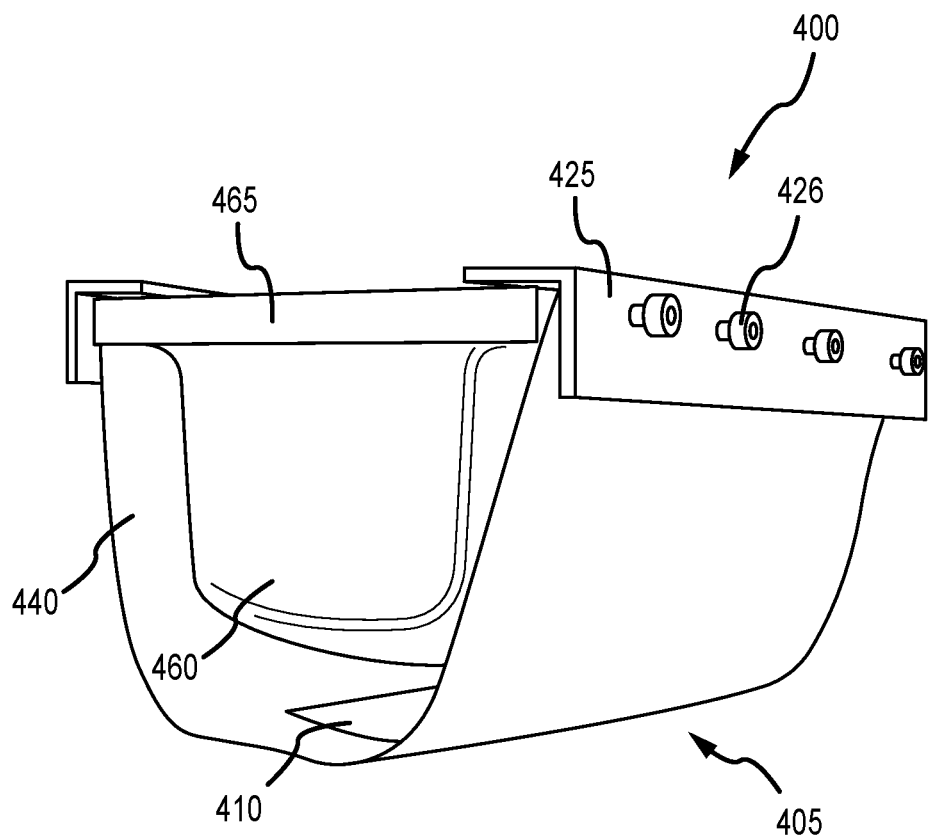
Figure 5:
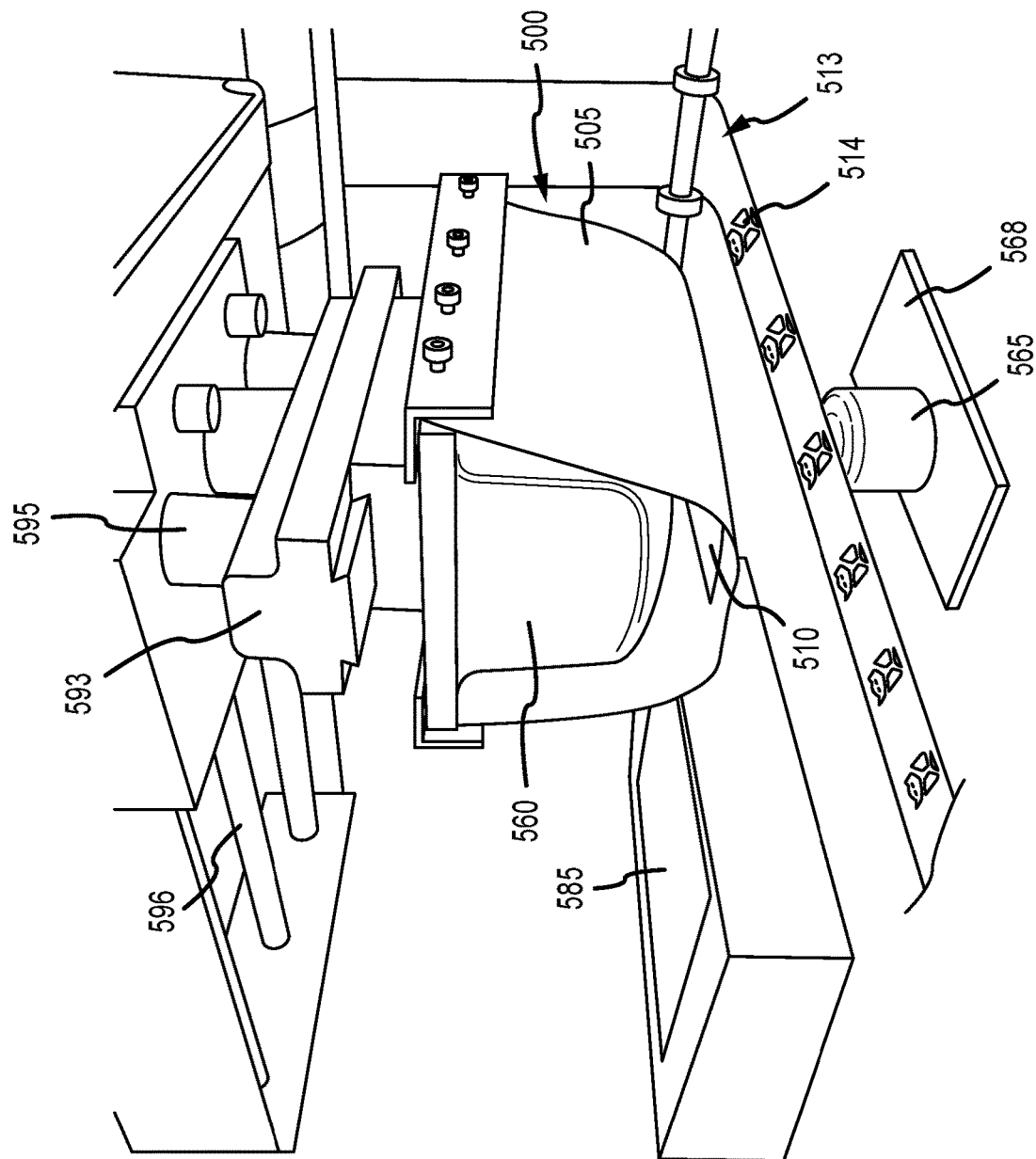
Figure 6:
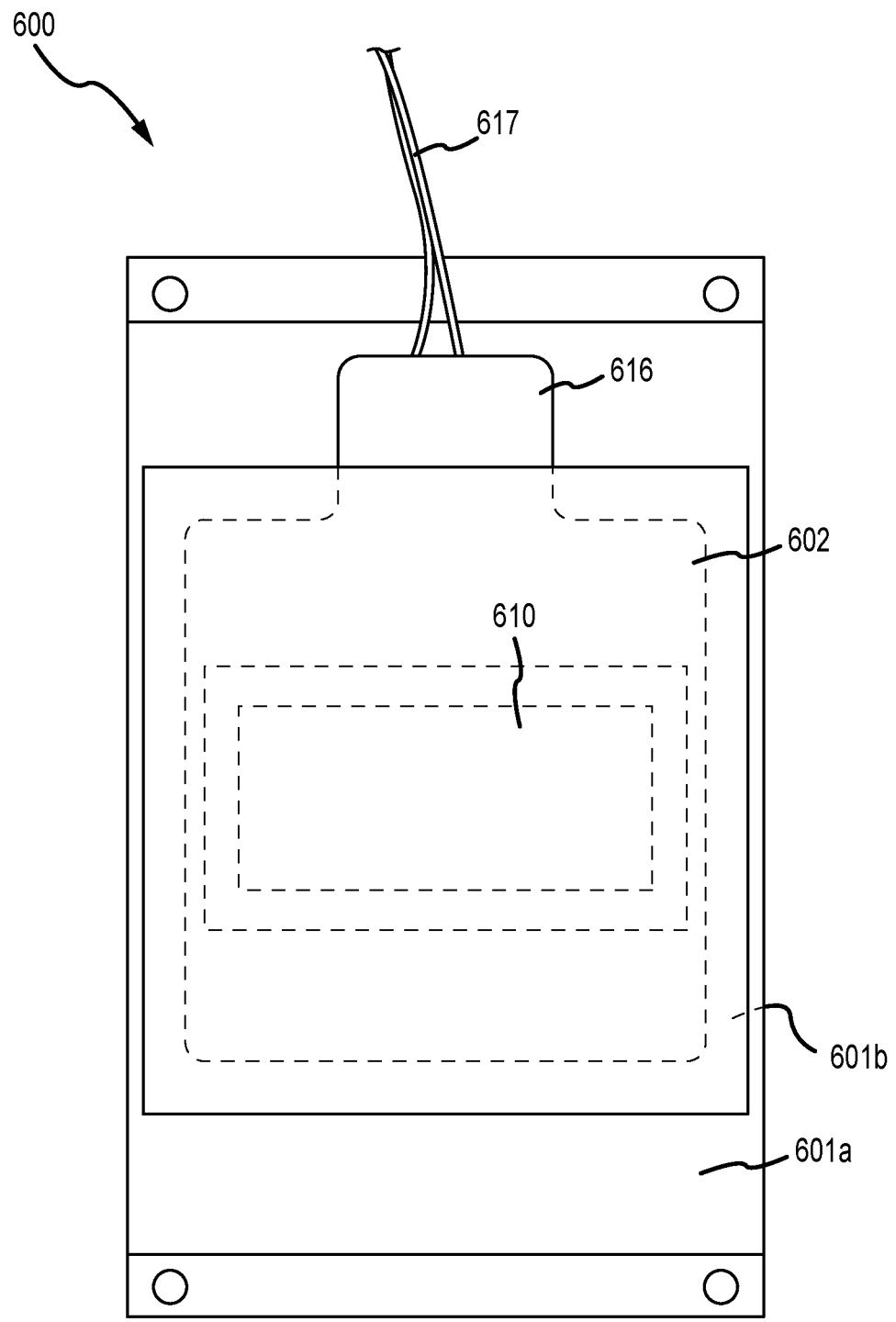
Figure 7:
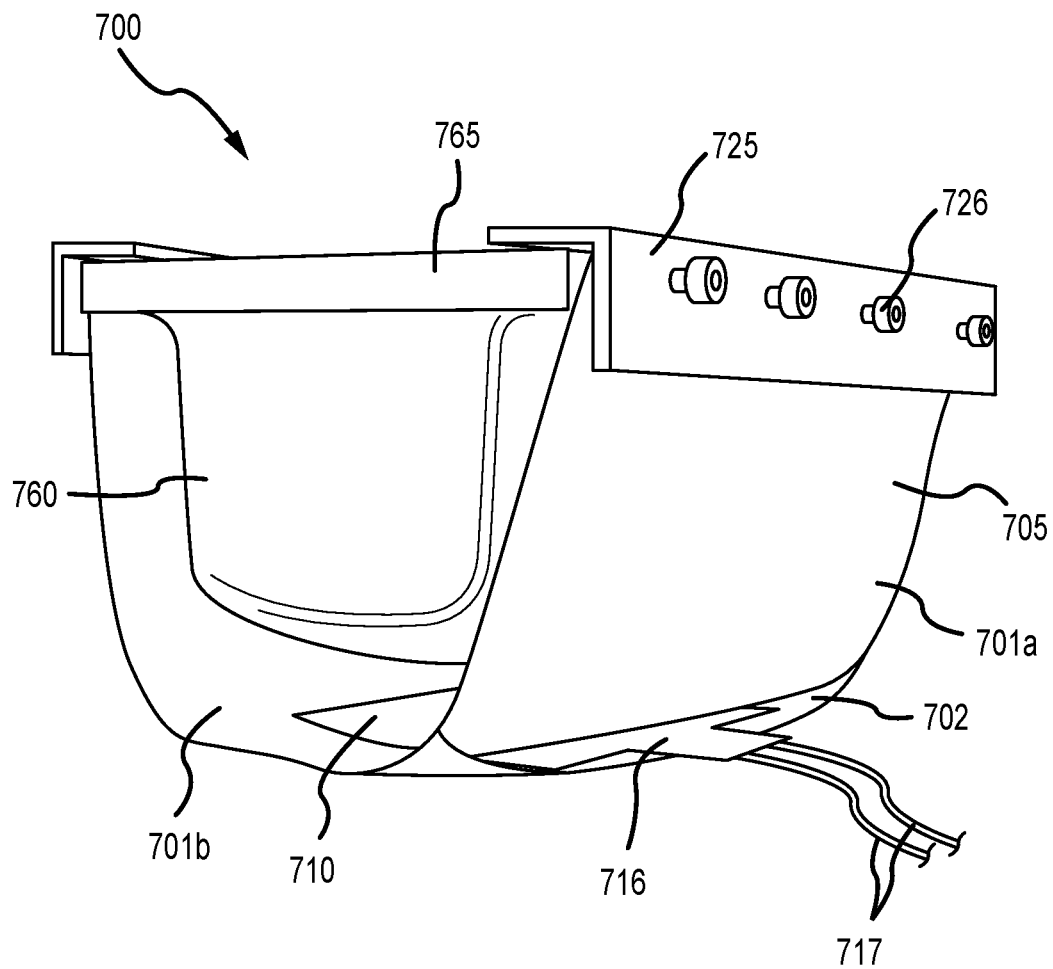
Figure 8A:
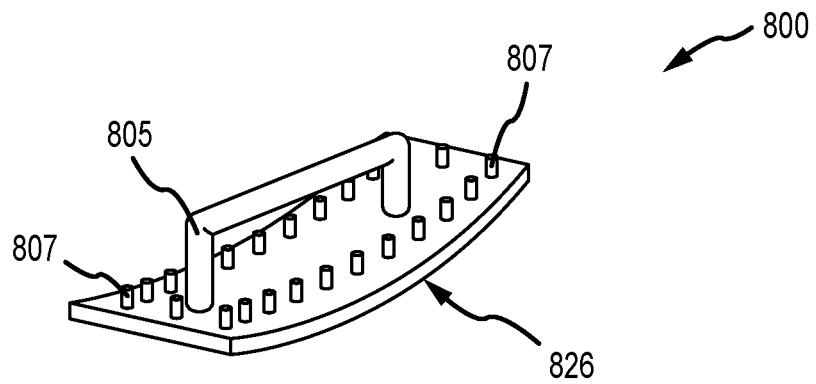
Figure 8B:
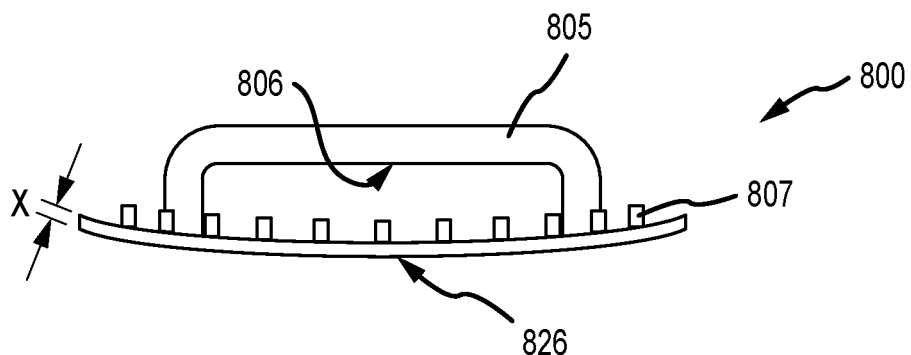
Figure 8C:
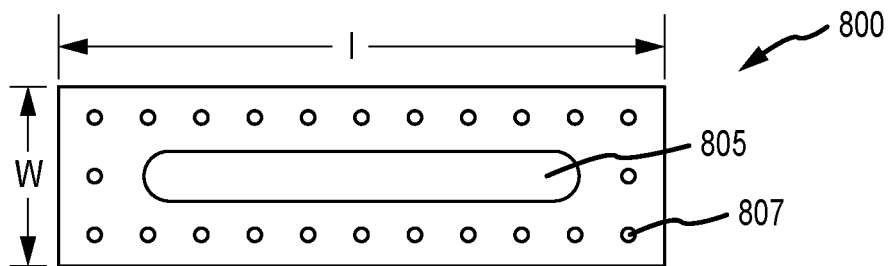
Figure 9:
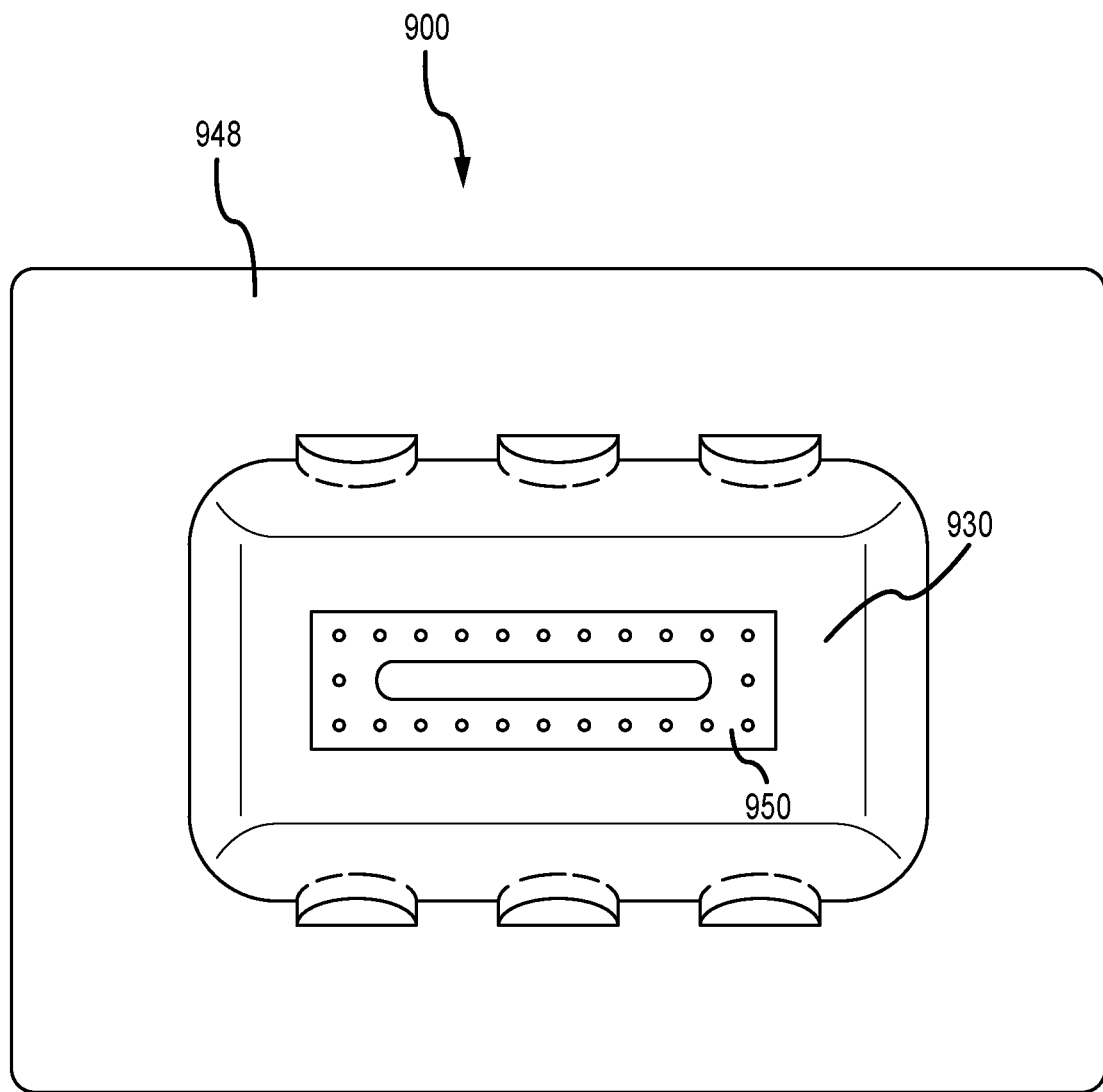
Figure 10:
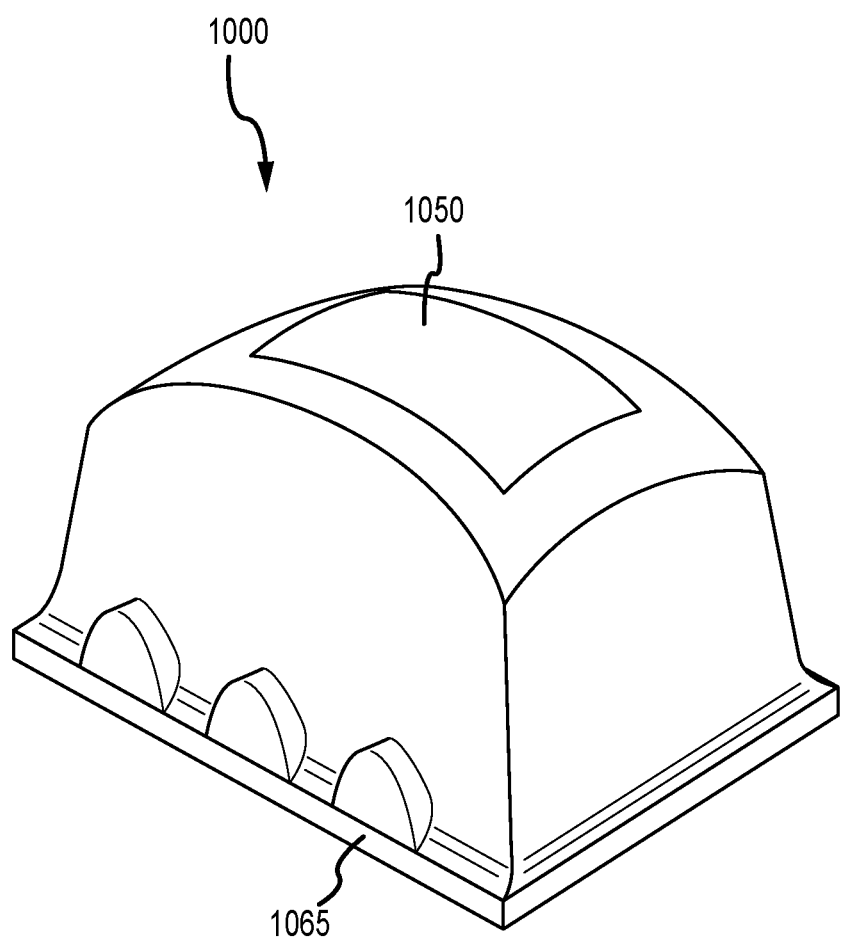

FIGS. 1A and 1B illustrate an embodiment of a flexible heat transfer die according to the present disclosure, comprising a portion of TIM laminated between two sheets of reinforcement fabric. FIG. 1A illustrates the stack of materials prior to lamination, and FIG. 1B illustrates the completed flexible heat transfer die after lamination of the reinforcing fabric layers;

FIGS. 2A and 2B illustrate an embodiment of a flexible heat transfer die according to the present disclosure, comprising a sheet of TIM laminated between two sheets of reinforcement fabric, wherein thin silicone or other insulative sheeting is cut into a pattern and used to block heat transfer from certain portions of the TIM. FIG. 2A illustrates the stack of materials prior to lamination, and FIG. 2B illustrates the completed flexible heat transfer die after lamination of the reinforcing fabric layers;

FIG. 3 illustrates an embodiment of a flexible heat transfer die according to the present disclosure comprising cure in place TIM cured within the confines of intricate recesses laser ablated into a ⅛-inch thick non-thermally conductive silicone rubber pad. In this example, the intricate recesses comprised the lettering of a graphics design. The area around the lettering was ablated down to leave the TIM lettering planarized on a raised island;

FIG. 4 illustrates a modified ink transfer pad assembly, wherein an externally heated flexible heat transfer die is loosely draped around a loaf-shaped transfer pad, and wherein opposite edges of the flexible heat transfer die are secured to the plywood backing of the transfer pad with brackets and screws. In various embodiments, the transfer pad illustrated comprises a block of silicone rubber having durometer 60 A Shore hardness on a base comprising a piece of plywood;

FIG. 5 illustrates an embodiment of an apparatus such as a pad printing machine useable for indicia transfer, comprising a heat source, such as a hot plate, positioned toward the rear for heating an assembly comprising a transfer pad draped with an externally heated flexible heat transfer die, and an indexing roll of indicia transfers indexable over the curved object to be decorated by the process;

FIG. 6 illustrates an embodiment of an internally heated flexible heat transfer die comprising a silicone heater blanket within a laminated reinforcing fabric pouch and in proximity to the TIM portion of the flexible heat transfer die;

FIG. 7 illustrates a modified ink transfer pad assembly, wherein an internally heated flexible heat transfer die is loosely draped around a loaf-shaped transfer pad, and wherein opposite edges of the flexible heat transfer die are secured to the plywood backing of the transfer pad with brackets and screws. In various embodiments, the transfer pad illustrated comprises a block of silicone rubber having 60 A Shore hardness on a base comprising a piece of plywood. The electrical wires of the internal silicone heater can be seen emerging from the assembly;

FIGS. 8A-8C illustrate an embodiment of a molded TIM heater usable within an integrated flexible heat transfer die. The TIM heater comprises at least one protrusion having an undercut side and a plurality of upstanding projections so that the molded elastomer of the transfer pad can grip around the TIM heater and secure it in the finished integrated article;

FIG. 9 illustrates a top view of an embodiment of an ink transfer pad mold, wherein the TIM heater of FIGS. 8A-8C has been fixed to the bottom of the mold prior to filling the mold with a curable silicone rubber or other curable elastomeric polymer; and FIG. 10 illustrates an embodiment of a completed integrated flexible heat transfer die coming from the mold in FIG. 9, wherein the resulting loaf-shaped transfer pad comprises a TIM heater surrounded on three sides by the molded silicone rubber, leaving an exposed face of the TIM on the contact side of the transfer pad.

DETAILED DESCRIPTION

The detailed description of exemplary embodiments refers to the accompanying drawings, which show exemplary embodiments by way of illustration and best mode. While these exemplary embodiments are described in enough detail to enable those skilled in the art to practice the invention, other embodiments may be realized, and logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Printing inks, transfers and methods of decorating polyolefin articles have been disclosed previously in U.S. Pat. Nos. 8,349,917 and 9,296,243, the disclosures of which are incorporated herein by reference in their entireties for all purposes. The present disclosure details a substantial improvement over these patents, and solves the various problems mentioned above that were not previously appreciated, namely the ability to decorate plastic articles having an uneven surface and articles that would be entirely crushed, or articles having raised texturing that would be collapsed. As will become apparent herein, the thermal indicia transfers disclosed in the '917 and '243 patents, comprising polyolefin particles, can be used in the present methods incorporating a flexible heat transfer die rather than an inflexible assembly comprising a heated metal plate and a hard, thin rubber die. In certain examples, the thermal indicia transfers disclosed in the '917 and '243 patents are also used in a dual-cycle process wherein indicia are first transferred off the carrier sheet and then fused into the surface of the plastic article to be decorated.

In various embodiments, new methods, apparatus and systems for decorating molded plastic articles having uneven surfaces or having hollow or otherwise crushable structures such as surface texturing has now been discovered.

Definitions

As used herein, the terms "sheet" or "sheet-like" refer to a characteristic shape of an article of manufacture, wherein the length and width of the article are both orders of magnitude larger than the thickness of the article. Illustrative examples of "sheet-like" include a piece of writing paper, i.e., an 8½ inch (215.9 mm)×11 inch (279.4 mm) sheet of paper with a thickness of only about 0.004 inches (0.1 mm), and a swatch of fabric with similar dimensions as the paper. In various embodiments herein, a flexible heat transfer die may be in the physical form of a sheet, i.e., it may appear sheet-like. In various embodiments, a flexible heat transfer die may comprise a laminated construct of fabric layers and other materials yet still appear substantially the same as a piece of fabric, like a drapery. However, being "sheet-like" does not require that an article of manufacture have a uniform thickness across both its length and width. For example, a laminated sheet-like article herein may have a thicker portion, such as if a thicker article is laminated between two sheets of fabric and the article inside can be seen or felt as providing a thicker area than the remaining portions of the laminate. The "top" and the "bottom" of a sheet-like article refer to the visibly large surface area directly in front of the viewer and the equally large surface underneath, on the opposite side, rather than any of the edges. If a sheet-like article has some measurable or visually observable thickness, yet is still flexible, the article may be referred to as having a pad structure or being pad-like rather than being sheet-like.

As used herein, the term "thermal interface material," or "TIM," refers to that material used in the electronics industry between two parts to enhance thermal coupling from one part to the other. TIM is typically used to fill the gap between an electronic component that becomes excessively hot during use and an adjacent heat sink, such that heat in the electronic component can be continuously and efficiently conducted out from the component and into the heat sink, preventing the electronic component from overheating. TIM may comprise silicone and/or non-silicone materials. The physical forms of TIM include, for example, thermal grease, thermal adhesive, thermal gap filler, thermally conductive pad, thermal tape, thermal films, and phase-change materials. These materials are thus well-known as heat conduits, not heat storage materials. TIM generally comprises silicone rubber or a non-silicone elastomeric polymer impregnated with thermally conductive particles, such as ceramic, metal or carbon, including carbon nanotubes and graphene. Without the conductive particles dispersed in the TIM, the base material may be silicone or a non-silicone polymer that is electrically and thermally non-conductive. TIM is purposely designed to be thermally conductive and to be very soft so that it conforms into uneven gaps between substrates such as electronic components on a circuit. The thermal conductivity of TIM is expressed in units of Watts per meter per degree Kelvin, (more conveniently abbreviated as "W/m-K"). In various embodiments, TIM for use herein may have a thermal conductivity of up to about 50 W/m-K. In various embodiments, TIM for use herein may have a thermal conductivity in the range of from about 35 W/m-K to about 45 W/m-K. In various embodiments, the hardness of TIM material for use herein is up to about 60 on the durometer Shore A scale (i.e., up to about 60 A), explained in more detail herein. In various embodiments, the thickness of a TIM portion for an externally heated, internally heated, or integrated flexible heat transfer die in accordance with the present disclosure may be up to about 0.4 inches (1 cm, 10 mm).

As used herein, the term "flexible heat transfer die" generally refers to a flexible article of manufacture that in various embodiments comprises a sheet-like or pad-like structure, in some instances resembling a drapery with a thickness much smaller in size than either a length or a width of the article, and wherein the thickness need not be uniform across the length or width of the article. In other embodiments, an "integrated heat transfer die," defined below, is a version of the general concept of a flexible heat transfer die herein, e.g., in that the integrated article also comprises a portion of TIM and a reinforcement material in contact with, and dimensionally supporting, the TIM material, e.g., reinforcement material comprising molded silicone rubber or another cured elastomer. A flexible heat transfer die herein may be externally heated, internally heated, or integrated, wherein the integrated flexible heat transfer die is also externally heated. A flexible heat transfer die herein is capable of being heated to a temperature of from about 375° F. (191° C.) to about 475° F. (246° C.), to maintain heat within its structure, and to repeatedly transfer that heat to an object placed in contact with the die. The term "flexible" is used herein to generally describe a characteristic of a heat transfer die according to the present disclosure, but is not meant to limit certain movements that the flexible die may experience under stress. A flexible heat transfer die herein necessarily comprises a portion of thermal interface material (TIM), which may be described as conformable or malleable, or rubber-like and deformable, depending on the durometer hardness of the material. In various embodiments, a flexible heat transfer die may outwardly appear as a flexible sheet of fabric, a flexible rubber pad, or a deformable rubber block or loaf to the casual observer, even though a portion of the flexible heat transfer die necessarily comprises fairly soft and malleable TIM.

As used herein, the term "durometer Shore hardness" or "durometer hardness" takes on its ordinary meaning of a hardness value used to indicate the hardness of a material. There are three Shore hardness scales that overlap, namely the Shore 00, Shore A and Shore D hardness scales. Of interest herein are mostly the TIM materials having a hardness reportable within the Shore 00 and Shore A hardness scales, which is generally indicative of soft rubbers and gels. As an example, a rubber band may have a Shore 00 hardness of about 60-70. The lower the Shore 00 hardness value the softer the material. Thus, a material with a Shore 00 hardness of 35 is softer and more malleable than a material with a Shore 00 hardness of 45, although it is important to understand that materials having a Shore 00 hardness of less than about 45 are quite soft and deformable, like plumber's putty. Shore A and Shore D scales are indicative of harder, less malleable materials, but portions of at least the Shore A range include typical rubbery materials. For example, a ⅛-inch (3 mm) thick flexible silicone rubber sheet for use as a TIM reinforcement material herein may have a Shore A hardness of 60. Also, a silicone rubber transfer pad for a pad printing machine for use herein may have a Shore A hardness of 60. These materials are soft and deformable, but not necessarily malleable. In various embodiments, TIM material for use herein may have a durometer Shore A hardness of up to about 60, (i.e., up to about "60 A"). In instances where a TIM portion is physically supported by a silicone rubber or other elastomeric reinforcement material, the durometer hardness of the TIM and the durometer hardness of the silicone rubber or other elastomeric reinforcement material may be the same or different.

As used herein, the term "reinforcement material" indicates any structural support component of a flexible heat transfer die, whether directional or disperse in its reinforcement. In various embodiments, reinforcement of a portion of TIM is accomplished by surrounding the TIM portion with any combination of silicone rubber having a Shore hardness in the A or D scale, heat resistant fabrics, cured RTV vulcanized silicone rubber, and/or Kapton® or Teflon® film. Thus, a portion of TIM may be physically restrained in one or more directions by any combination of these materials. In various embodiments, a TIM portion is physically restrained in at least two directions by a combination of reinforcement materials. In various examples, silicone rubber or other cured elastomeric polymer provides a physical barrier to the TIM, where the cured rubber is equal to in hardness or harder (indicated numerically in Shore hardness) than the TIM. For example, an integrated flexible heat transfer die according to the present disclosure may comprise an elastomeric polymer at least partially molded around a portion of TIM, so that the TIM is at least partially contained within the molded structure. In other examples, a sheet of TIM is reinforced in at least two directions by laminating reinforcing fabric on both sides of the TIM sheet. In other examples, TIM is contained by backing it with a layer of cured RTV vulcanized silicone rubber and/or Kapton® or Teflon® film. In additional examples, TIM is dimensionally contained by surrounding the periphery of the TIM with a silicone rubber pad and providing a backing layer of RTV silicone rubber and/or Kapton® or Teflon® film on the backside of the TIM. It should be noted that a TIM portion can be left "open faced" on the side that will be involved in the indicia transfer process, although a flexible heat transfer die herein having such an arrangement may be less durable than a flexible heat transfer die having the TIM portion completely protected on both sides and it's periphery by any combination of silicone rubber pad, heat resistant fabrics, cured RTV vulcanized silicone rubber, and/or Kapton® or Teflon® film, although the durability over repeated deformation is also dependent upon the durometer hardness of the TIM portion used in a flexible heat transfer die.

As used herein, the term "cured elastomeric polymer" takes on the common meaning of a curable specialty polymer that once cured exhibits elastomeric properties, namely rubber elasticity. The term "cured" refers to the polymer beginning as a liquid, but then transformable into a rigid article. Elastomeric polymers may be diene, non-diene or thermoplastic in type. Elastomeric polymers may be selected from the group consisting of polyisoprene, natural polyisoprene (natural rubber, or NR), polybutadiene, polychloroprene, polyisobutylene, silicone rubber (polysiloxane), styrene-butadiene rubber (SBR), neoprene rubber, nitrile rubber, polyurethane, fluoroelastomer and mixtures thereof. Elastomeric polymers may be cross-linked. In many instances herein, a cured elastomeric polymer comprises a silicone rubber. In some instances, the term "cured silicone rubber" is used interchangeably with the term "cured elastomeric polymer." In various embodiments, an article comprising a cured elastomeric polymer comprises a large block of silicone rubber, such as an ink transfer pad used in the pad printing industry (explained below).

As used herein, the term "transfer pad" or "ink transfer pad" refers to a block of silicone rubber or other soft conformable material, such as a cured elastomeric polymer, mounted on a platform base, and used in a pad printing machine for transferring ink from a tray of ink to an article to be inked. In various embodiments, a transfer pad may be generally referred to as a "silicone rubber block or loaf," with the understanding that the material of construction can be any cured elastomeric polymer, not just silicone rubber. The platform base provides attachment to a movable arm of the pad printing machine and may comprise metal or wood. The side of the molded block of silicone rubber opposite the platform base may be referred to herein as the "contact side" of the transfer pad. The platform side of the transfer pad is attached to a movable arm or piston of a pad printing machine. The contact side of the transfer pad is used in conventional pad printing for ink transfer and printing. In various embodiments herein, a transfer pad may be draped with an externally or internally heated flexible heat transfer die to cover the contact side of the transfer pad such that the flexible heat transfer die becomes the contact surface in the indicia transfer process. Opposite edges of the flexible heat transfer die may be fastened to the platform base of the transfer pad with thumbtacks, staples, nails, woodscrews, machine screws, bolts, snaps, Velcro®, or any other fasteners to secure the flexible heat transfer die in place, draped around the contact side of the transfer pad. A wood base of the transfer pad makes it somewhat simpler to devise various fastening concepts for attaching a flexible heat transfer die to an ink transfer pad. The transfer pad thus draped is used as a deformable press to conform the flexible heat transfer die to an uneven surface of a plastic article to be decorated when the transfer pad is compressed against the article. The cushioning effect of the transfer pad prevents the crushing of hollow plastic articles and the collapse of textures, possibly by distributing the force on the article to a wider area. Transfer pads for pad printing machines, which are adaptable by attachment of a flexible heat transfer die, are available from Pad Printers (Innovative Marking Systems), Lowell, Mass., AutoTran, Naples, Fla., and DECO Technology Group, Orange, Calif., amongst many other suppliers. A conventional "transfer pad" is distinguished from TIM in that the silicone rubber or other cured elastomer of the transfer pad does not include the dispersed thermally conductive particles that provide the thermal conductivity. However, custom transfer pads, such as made partially or entirely from TIM, or with a void filled in with TIM, are within the scope of the present disclosure. To avoid confusion, transfer pads comprising at least a portion of TIM partially encased in the elastomer of a transfer pad are referred to as "integrated flexible heat transfer dies," as defined below. Such custom integrated heat transfer dies can replace an assembly comprising a conventional transfer pad and a flexible heat transfer die draped thereon. Transfer pads are available in countless sizes and shapes because of their need in the pad printing industry for ink transfer.

As used herein, the term "integrated flexible heat transfer die," or more simply "integrated heat transfer die," refers to a combination of molded transfer pad and a portion of TIM, both defined above, wherein the TIM portion is at least partially contained inside the transfer pad. Such an arrangement can be made by molding an elastomeric polymer material for the transfer pad around a TIM portion placed inside the transfer pad mold. In various embodiments of an integrated heat transfer die, a surface of the TIM portion may remain entirely exposed and thus visible on one face of the transfer pad, e.g., on the contact side of the transfer pad. This particular configuration is obtained by fixing an appropriately shaped TIM portion against the bottom of the transfer pad mold prior to filling the mold with curable elastomer. When the transfer pad is cast in an elastomeric material, such as a curable silicone rubber, the TIM portion will not be entirely surrounded by the elastomer, and one face of the TIM will necessarily be left exposed in the finished integrated heat transfer die.

As used herein, the term "external heat source" generally refers to any source of heat that may be provided on or in close proximity to a pad printing apparatus as discussed herein. In many examples, an external heat source herein comprises a hot plate mounted on a modified pad printing machine, and in those instances, an externally heated flexible heat transfer die is repeatedly physically pressed against the hot plate so that it can pick up heat. However, use of a hot plate per se should not be construed as limiting as to how an externally heated flexible heat transfer die may be repeatedly heated during a hot-stamping operation. Repeatedly pressing an externally heated flexible heat transfer die onto a hard metal surface such as a hot plate can physically stress the externally heated flexible heat transfer over time, shortening its useful lifetime. Therefore, other external sources of heat find use herein that do not involve physical contact. In various embodiments, an external heat source mounted on or adjacent to a modified pad printing machine for heating an externally heated flexible heat transfer die comprises an infrared (radiant) heater. In this way, an externally heated flexible heat transfer die can be repeatedly heated by the infrared heater without the need to press the externally heated flexible heat transfer die onto the heat source.

As used herein, the term "thermal printing ink transfer" refers to a graphics transfer sheet comprising particulate polyolefin ink printed on a carrier sheet. These transfers are amply taught in U.S. Pat. Nos. 8,349,917 and 9,296,243, incorporated herein in their entireties. The particles of polyolefin in the ink can be polyethylene or polypropylene, or blends of the two, in certain particle size distributions. The transfers described in the '917 and '243 patents may be used with the flexible heat transfer dies taught herein to decorate plastic articles having uneven surfaces or hollow structures. In various embodiments, a single cycle process involves transfer of the indicia from the carrier sheet and simultaneous fusion into the surface of the article. In various embodiments, a dual cycle process involves a first step of transferring the indicia from the carrier sheet to the article and a second step of fusing the indicia into the surface of the article after the carrier sheet has been peeled off.

As used herein, the term "molded plastic article" refers to a polyolefin plastic structure (e.g., comprising polyethylene or polypropylene) that was previously molded by any known plastics fabrication process, such as injection molding, blow molding or rotational molding. Such articles may include toys, sporting goods, municipal trash barrels, tanks, signage, displays, and the like. Virtually any polyolefin article may be decorated by the methods, apparatus and system disclosed herein, even very large articles that would not ordinarily fit within a hot-stamping or pad printing machine. The articles of interest herein for decorating include, but are not limited to, molded plastic items having uneven or otherwise non-flat surfaces, such as contours or stepwise gradations or textures, tubular structures like pipes or handles, cylindrical or cup-like shapes, and the like.

As used herein, the term "uneven surface" refers broadly to any surface of a plastic article that is not entirely planar. Therefore, uneven surfaces herein for decorating with indicia include, but are not limited to, surfaces that are rounded, tapered, contoured, gradated (i.e., having stepwise changes in height), or textured. A convexly textured surface, such as a surface having a plurality of small bumps, such as for gripping, presents a unique challenge in indicia transfer in that the convex texturing may be flattened under pressure, and it is difficult to conform printed indicia to the multitude of height changes characteristic of texturing. Texturing that is concave rather than convex, such as dimples on a golf ball, presents another decorating challenge even though the texturing might not be structurally collapsed under pressure. In various embodiments, the methods, apparatus and system disclosed herein are capable of decorating plastic articles having uneven surfaces comprising any combination of convex and concave texturing, and any plastic articles that might be crushed under the conditions used in high-pressure stamping processes, such as plastic articles having a hollow structure under a surface to be decorated.

As used herein, the term "Teflon®" refers to polytetrafluoroethylene, or PTFE, a registered trademark of Chemours/DuPont. The material is believed to have a thermal conductivity of about 0.25 W/m-K. A Teflon® thin film finds use herein as a reinforcement material for TIM in that it is heat resistant up to at least 600° F. and is at least somewhat thermally conductive. Thus, in some respects, a Teflon® thin film covering a TIM portion in a flexible heat transfer die will not block heat transfer from the TIM. Teflon® Thin Film in thicknesses ranging from 1 mil to 20 mil is available from Fluoro-Plastics, Inc, Philadelphia, Pa. In various embodiments, Teflon® Thin Film for use herein has a thickness of 3 mil. Teflon® is also of interest in the heat resistant fabrics used for reinforcing materials for the TIM. Therefore, the terms "Teflon® thin film" and "polytetrafluoroethylene thin film" are used interchangeably.

As used herein, the term "Kapton®" refers to a polyimide plastic, specifically poly-oxydiphenylene-pyromellitimide, and is a registered trademark of DuPont. Although exhibiting less thermal conductivity than Teflon®, (about 0.12 W/mK), a Kapton® thin film finds use herein as a reinforcement material for TIM in that it is not entirely insulating and is heat resistant up to at least 700° F. (371° C.). Kapton® Polyimide Film for use herein is available in 1, 2, 3, and 5 mil (0.0254 mm, 0.0508 mm, 0.0762 mm, and 0.127 mm) thicknesses from DuPont. In various embodiments, Kapton® Polyimide Film for use herein has a thickness of 3 mil (0.0762 mm). The terms "Kapton® thin film" and "poly-oxydiphenylene-pyromellitimide thin film" are used interchangeably herein.

As used herein, the term "Fiberglas®" or "fiberglass" takes on its ordinary meaning of glass fibers that can be used in glass fiber-reinforced plastics.

General Embodiments

Non-limiting embodiments of a flexible heat transfer die in accordance with the present disclosure include: (1) an externally heated flexible heat transfer die; (2) an internally heated flexible heat transfer die; and (3) an integrated flexible heat transfer die. In general, the embodiments encompassed in (1) and (2) comprise a sheet-like or pad-like structure, whereas the embodiments encompassed in (3) take on the outward appearance of a molded silicone rubber or other elastomeric ink transfer pad, e.g., a loaf-shaped block. Further, embodiments encompassed in (1) and (2) are draped around a molded rubber ink transfer pad to make an assembly, whereas the embodiments encompassed in (3) take the place of the entire assembly. Viewed broadly, an integrated flexible heat transfer die in accordance with the present disclosure is a "streamlined" or "cleaner" version of an assembly comprising a standard non-thermally conductive ink transfer pad draped with either an externally heated or internally heated flexible heat transfer die as described herein.

1. Flexible Heat Transfer Die—Externally Heated:

In various embodiments, an externally heated flexible heat transfer die comprises: (A) a thermal interface material (TIM); and (B) a reinforcement material in contact with the TIM. In various embodiments, an externally heated flexible heat transfer die is in the physical form of a sheet or drape, wherein two reinforcing fabric layers are laminated around the TIM so that the TIM is sealed and protected between the two reinforcing fabric layers.

FIGS. 1A and 1B illustrate an embodiment of an externally heated flexible heat transfer die 100. As shown in FIG. 1A, the externally heated flexible heat transfer die 100 comprises a top sheet of reinforcing fabric 101b and a bottom sheet of reinforcing fabric 101a, dimensionally similar, which are laminated together around an internally disposed portion of TIM 110 so as to trap and seal the TIM 110 between the two sheets. An adhesive may be distributed between the layer and around the TIM portion for this purpose. The final product is shown in FIG. 1B, wherein the TIM portion 110 is at least partially hidden within the laminated structure, but may be seen or felt as a thicker and/or heavier portion within the overall laminate construct. In various embodiments, the reinforcing fabric sheets 101a and 101b are very thin and somewhat transparent, allowing the TIM portion 110 to be visible through the fabric on either side. In other embodiments, the fabric sheets are denser and less see-through, leaving the TIM portion 110 essentially obscured, and not visible other than as a thickness change to the externally heated flexible heat transfer die 100.

In various embodiments, the TIM may comprise a previously cured thermally conductive sheet of silicone interface pad, i.e., a portion of interface pad that has been trimmed into the desired shape and dimensions. In other embodiments, the TIM may comprise a curable "cure in place" thermally conductive silicone elastomeric gel that has been put in a mold and cured. For simple TIM shapes, such as the rectangular TIM sheet or pad-like portion 110 shown in FIGS. 1A and 1B, there may be no outward differences in physical appearance between a cut portion of TIM from a stock interface pad or a molded portion of TIM that has been molded into this rectangular shape using a curable thermally conductive silicone elastomeric gel.

In various embodiments, the reinforcement material in contact with the TIM may comprise any combination of fabric, silicone rubber pad, molded elastomeric polymer, RTV vulcanized silicone rubber adhesive, and/or Kapton® or Teflon® film. These reinforcement materials may be used in any combination to provide mechanical containment of the TIM in at least two directions when the flexible heat transfer die is put into use for hot-stamping indicia transfers.

In various embodiments, the reinforcement material provides a template or mold for the TIM. For example, a window may be cut into a silicone pad, or portions of a silicone pad may be etched away to provide openings or recesses into which a suitably sized precured thermally conductive sheet of silicone interface pad can be fitted, or into which a curable "cure in place" thermally conductive silicone elastomeric gel can be added and then cured. In other embodiments, a portion of a pad printing transfer pad, such as a portion from the contact side of a molded loaf-shaped silicone rubber transfer pad, may be cut, ground, or ablated away, and then this recess filled in with cure in place thermally conductive silicone elastomeric gel, which is then cured.

In various embodiments, an assembly for use in decorating plastic articles comprises a transfer pad and a flexible heat transfer die draped around and fastened to the transfer pad. The transfer pad is well-known as an attachment to a pad printing machine. In other embodiments explained herein, an integrated flexible heat transfer die replaces an assembly comprising a transfer pad and a flexible heat transfer die draped around it.

A). The Thermal Interface (TIM) Material—

In various embodiments, the TIM portion of the flexible heat transfer die may comprise a silicone polymer, a non-silicone polymer, such as polyurethane, graphite, synthetic graphite, or other non-silicone materials, in the form of a tape, sheet, film, grease, paste, pad, or various other physical form. TIM may be typically provided in the form of a thermal grease, thermal adhesive, thermal gap filler, thermally conductive pad, thermal tape, thermal film, or a phase-change material.

In various embodiments, the thermal conductivity of the TIM material for use herein is in the range of up to about 50 W/m-K. In various embodiments, the thermal conductivity of the TIM material for use herein is in the range of from about 25 W/m-K to about 30 W/m-K. In various embodiments, the thermal conductivity of the TIM material for use herein is in the range of from about 0.5 W/m-K to about 12 W/m-K. In various embodiments, the thermal conductivity of the TIM is from about 1.0 W/m-K to about 6 W/m-K.

In various embodiments, the TIM comprises a silicone rubber interspersed with one or more thermally conductive materials, such as ceramic or metal particles, carbon nanotubes, graphene, boron nitride, alumina, aluminum oxide, aluminum nitride, magnesium oxide, zinc oxide, silicon carbide, beryllium oxide, or other materials. In various embodiments, the TIM comprises silicone rubber interspersed with ceramic particles. A review of TIM materials may be found, for example, in D. Chung, "Thermal Interface Materials," *Journal of Materials Engineering and Performance*, 10(1), 56-59, 2001.

TIM for a flexible heat transfer die herein may be conveniently sourced in the form of a cured sheet of material, or as a curable compound, or in other physical forms. In various embodiments, the TIM comprises an elastomeric silicone rubber sheet or a curable silicone polymer for "cure in place" TIM, such as a two-component, low viscosity, thermally conductive silicone elastomer that cures at room temperature, either version including thermally conductive particles.

For use herein, TIM in thin sheet form may be shaped (e.g., cut/trimmed) to a chosen 2-dimensional size for use in a flexible heat transfer die, or TIM in a curable resin form may be poured, troweled, or otherwise disposed into a mold and then cured in place to provide the portion of TIM needed for the flexible heat transfer die. In certain embodiments, the mold for the TIM is a window or recess, or series of recesses in the form of indicia cut into a reinforcement material that becomes part of the flexible heat transfer die. Depending on the nature of the cure in place compound, various curing methods can be used to complete the curing process, e.g., light, heat or just ambient conditions.

In various embodiments, TIM for use herein, whether obtained in a pre-cured form and trimmed, or obtained after in-place curing in a mold, is soft and malleable, resembling plumber's putty in certain ways, but in some examples, the TIM may be deformable and resilient, like rubber, and not as soft and pliable as putty. In various embodiments, the TIM for use herein has a range of hardness of from about 20 durometer Shore 00 to about 60 durometer Shore A, recognizing that the durometer Shore 00 and durometer Shore A scales overlap. In various embodiments, the TIM for use herein has a durometer Shore 00 hardness in the range of from about 25 to about 70. In other examples, the TIM has a durometer Shore 00 hardness of from about 30 to about 60. In certain instances, the TIM has a durometer Shore 00 hardness of 45 or 50. In various examples, the TIM has a durometer hardness of 45-50 Shore A, 20-30 Shore A, or in certain examples, 30 A, or 60 A.

For a flexible heat transfer die herein, the TIM comprises a thickness of from about 0.25 mm to about 10 mm. In various embodiments, the TIM has a thickness of from about 1 mm to about 5 mm. In various embodiments, the TIM has a thickness of about 1 mm, about 2 mm, or about 3 mm. There are several variables that can be considered when optimizing the thickness of the TIM in a flexible heat transfer die. Some of the more important variables include, but are not limited to, the cost of the TIM, how mechanically durable the TIM portion is, how much heat the TIM can hold, and the temperature at which the TIM can be held over hundreds to thousands of cycles of picking up heat from an external heat source, such as a hot plate, or an internal electrical heater and transferring heat to a thermal printed ink transfer and plastic part. Thus, a thicker portion of TIM would be expected to hold more heat and to be able to maintain a constant high temperature, e.g., over 400° F. (204° C.), over repeated printing cycles that include momentary contact with an external heat source or internal heating and indicia transfer in a hot-stamping process. However, thicker TIM may be cost prohibitive, and may lead to long start-up times to equilibrate the TIM to a steady-state temperature. Further, a thicker portion of TIM may be more difficult to dimensionally stabilize with reinforcement materials. In various examples, a 3 mm thick TIM portion in a flexible heat transfer die has been seen to be a more efficient heater than a 2 mm TIM portion, which has been seen to be a more efficient heater than a 1 mm TIM portion, without any significant difference between the three thicknesses as to the number of contacts needed with a hot plate to reach a steady state heated condition.

A length and a width for the TIM portion within a flexible heat transfer die herein are chosen to roughly coincide with the dimensions of the thermal ink transfer carrying the indicia to be transferred to an article. In some instances, the length and width of the TIM portion of the die are designed to be at least somewhat larger than the outer periphery of the indicia to be transferred, such as by a few millimeters. Thus, the size of the TIM portion of the die may roughly mirror the size of the indicia transfer. There are some other factors that may be considered, and that may change the length and width chosen for the TIM. One notable factor is the acceptability of any "witness line" that may appear in the thermal transfer process. For example, when a rectangular shaped TIM portion is heated and pressed onto a polyolefin part, with an indicia transfer positioned between the TIM and the part, the part will receive the indicia but may also obtain an imprint from the heated TIM. The reason is that the TIM, like a heated metal plate, can melt the surface of the part to some degree and leave a visible texture on the part in the shape of the TIM portion. In some instances, such a rectangular border around the indicia lettering may be acceptable, perhaps even desirable. But in some cases, the rectangular or other shaped witness line may be unacceptable, and thus the TIM portion of a die herein may be shaped into a design that closely follows the outline of the indicia to be transferred, or at least fashioned into the smallest square or rectangular shape that very closely surrounds the boundaries of the indicia, such that the witness line is difficult to detect.

In various embodiments, the witness line is minimized by thermally masking portions of the TIM. For example, silicone rubber sheeting, ordinary masking tape, Kapton® film of about 1-8 mil (0.0254-0.2032 mm) thickness, or a silica-type or silica-polymer hybrid type aerogel veil, any of which not being particularly thermally conductive (<0.5 W/m-K), can be cut into shapes and placed over an otherwise square, round or rectangular, or other shaped portion of TIM to block heat transfer from those areas covered by the insulative sheeting. In some examples, non-thermally conductive sheeting can be intricately cut with a laser such that the removed portion, or window, closely mirrors the outline of the indicia to be transferred, and thus only those exposed areas of the TIM not covered by the intricately shaped insulative sheeting will transfer heat to the indicia transfer and plastic part.

As shown in FIGS. 2A and 2B, a flexible heat transfer die 200 comprises a TIM portion 210 that has been partially thermally obscured on one side by a cut sheet of insulative silicone rubber sheeting 214. The silicone rubber sheet 214 has been cut, as described above, to provide a window 212 through which the TIM portion 210 remains exposed. The window 212 in the silicone rubber sheet 214 may outline the outermost dimensions of indicia that will be applied to a plastic object in accordance with the present disclosure. As shown in FIG. 2A, the flexible heat transfer die 200 comprises two sheets of reinforcing fabric, 201a and 201b, that are laminated together to trap the TIM portion 210 therebetween. The cut silicone rubber sheeting 214 will generally remain in place on the face of the TIM while the layers of fabric 201a and 201b are laminated together, although small amounts of an adhesive can be used to keep the cut sheet 214 in position while the stack is laminated. In variations where the TIM is formed from a cure in place resin, the cut sheeting 214 can be laid on the resin as it cures into the cured TIM. FIG. 2B illustrates the finished flexible heat transfer die 200 comprising the TIM portion 210 trapped between the bottom sheet of reinforcing fabric 201a and the top sheet of reinforcing fabric 201b after a lamination process. Adhesive may be distributed around the TIM portion, between the layers, prior to the lamination process and to ensure integrity of the article after lamination. Such specialized flexible heat transfer dies like 200 in FIGS. 2A and 2B can be specific to a particular graphics shape.

In various embodiments, a durometer Shore 00 hardness of about 30-60 indicates that the TIM is highly conformable. Thus, when a 1-3 mm thin sheet of TIM having this Shore 00 hardness is pressed against an irregular surface, it will conform to that surface and transfer heat evenly to that irregular surface. However, TIM, being comprised of elastomeric material such as silicone rubber, also has shape memory, and the TIM sheet can return to its original flat sheet configuration without indentation once relieved of the pressure conforming it to the irregular surface. Similarly, if the TIM is conformed into a 180° curve around one half of a tubular part being decorated, the TIM will flatten back out into a flat sheet once the pressure used to conform the TIM into this curve is removed. In some instances, reinforcement material disposed against the TIM portion may help return the TIM portion to its original flat sheet configuration once relieved of the pressure conforming it to the irregular surface. FIGS. 1A-1B and FIGS. 2A-2B illustrate examples wherein sheets of reinforcement material in the form of reinforced fabrics are laminated around the TIM portion to help the TIM portion maintain its shape.

B). The Reinforcement Material—

Irrespective of TIM having some shape-memory characteristics, a reinforcement material is used with the TIM in accordance with the present disclosure. The reinforcement material suffices to dimensionally contain the TIM in at least two directions, and helps to straighten the TIM portion back into a flat sheet or other original shape when the reinforcement material is stiffer than the TIM. Although one side of the TIM portion of a flexible heat transfer die can be left exposed (i.e., open-faced), reinforcement material around at least all the remaining sides of the TIM provides protection to the TIM portion of the die and extends the lifetime of the die used in hot-stamping indicia transfer processes, such as into the 10's of thousands of hot-stamping cycles.

In various embodiments, the reinforcement material comprises at least one of a fabric, a silicone rubber pad, a molded silicone or other cured elastomeric material, an RTV vulcanized silicone rubber adhesive, a Teflon® film or a Kapton® film.

In various embodiments, the reinforcement material comprises a fabric. The fabric may be heat stable to over 500° F. (260° C.), for example, and may be mechanically stable (i.e., tear and wear resistant). Fabrics that find use as a reinforcement material include, but are not limited to, woven and nonwoven fabrics, fiber reinforced woven and nonwoven fabrics, various resin impregnated fabrics, laminate composites, such as cross-plied nonwoven layers laminated together, and scrims. Fabrics for use herein may be reinforced with glass fibers or any plastic fibers that are stable at the indicia transfer temperatures. In various embodiments, a reinforcement material herein may comprise Fiberglas® reinforced Teflon® fabric (i.e., a glass fiber reinforced PTFE fabric). Such material may appear as a PTFE resin impregnated glass fiber scrim. In various embodiments, a flexible heat transfer die comprises a flat portion of TIM, such as a sheet measuring about 1-3 mm thick, positioned and sealed between two sheets of glass fiber reinforced PTFE fabric. FIGS. 1A, 1B, 2A and 2B illustrate exemplary flexible heat transfer dies that utilize reinforced fabric sheets as the reinforcement material to dimensionally contain the TIM.

In various embodiments, not intended to be limiting as to sizes or types of materials, a flexible heat transfer die comprises: (i) a first sheet of 0.0025-0.0115 inch (0.0635-0.3 mm) Fiberglas® reinforced Teflon® fabric measuring about 10 inches (254 mm) by about 6 inches (152 mm); (ii) a sheet of TIM measuring about 5 inches (127 mm) long×2 inches (51 mm) wide×0.079 inches (2 mm) thick in contact with the first sheet of fabric and centered thereon with the longer edge of the fabric parallel to the longer edge of the TIM; and (iii) a second sheet of 0.0025-0.0115 inch (0.0635-0.3 mm) Fiberglas® reinforced Teflon® fabric measuring about 10 inches (254 mm) by about 6 inches (152 mm) in contact with the sheet of TIM and squared up with the first sheet of fabric such that the peripheries of each fabric sheet are aligned, wherein the two sheets of fabric are laminated together so as to encapsulate the portion of TIM disposed between the fabric layers, and create a three-layer laminate construct.

In various embodiments, the sheets of fabric are laminated together by applying an FEP lamination adhesive between the fabric layers and around the outline of the TIM layer, and then thermally welding the fabric layers together. The resulting flexible heat transfer die may then be draped around the contact side of a pad printing machine transfer pad and fastened to the platform base of the transfer pad to secure it thereon (e.g., see assembly 400 in FIG. 4 and the corresponding discussions herein). The resulting assembly is then used in a hot-stamping process as described herein. In other variations, the resulting flexible heat transfer die is wrapped around and secured to a roller of a roll-on hot-stamping machine. For the roll-on hot-stamping machine, the flexible heat transfer die may cut to a size such that it wraps only one revolution around the roller, to which it can be bound by an adhesive. For the roller application, the TIM may cover the entire circumference of the roller, extending in a width similar to the width of indicia to be applied to an article.

The width of the reinforcing fabric may be any size needed to accommodate a particular application. In various embodiments, the width is chosen so that the finished flexible heat transfer die can be draped around the transfer pad and fastened to opposite edges of the platform base of the transfer pad to provide an assembly. Assemblies resulting from the combination of flexible heat transfer die and transfer pad would have the general appearance of assembly 400 in FIG. 4. In other words, a flexible heat transfer die herein may comprise inexpensive "salvage" that is primarily used for attaching the flexible heat transfer die to a transfer pad of a pad printing machine. Both the size of the transfer pad and the size of the flexible heat transfer die are chosen to accommodate the size of the indicia transfer. So, for example, to transfer lettering measuring in total about 1 inch (25 mm) wide×4 inches (102 mm) long, a transfer pad measuring about 3 inches (76 mm) wide×6 inches (152 mm) long×3 inches (76 mm) thick may be chosen. The flexible heat transfer die would then be designed to measure about 9 inches (229 mm) wide×6 inches (152 mm) long, such that it can be draped around the transfer pad, considering its thickness, and span the 6 inch (152 mm) length of the transfer pad. The TIM portion within the flexible heat transfer die would be about 1.25 inches (32 mm) wide×4.25 inches (108 mm) long×0.04 inch (1 mm) to about 0.08 inches (2 mm) thick, i.e., a little larger in size than the overall footprint of the lettering, with the TIM portion centered in the overall dimensions of the flexible heat transfer die such that it centers on the contact side of the transfer pad. Most or all of this salvage fabric can be trimmed away if the flexible heat transfer die is used in combination with a roller from a roll-on hot-stamping machine, so that TIM is present around the entire circumference of the roller.

In various embodiments, the reinforcement material comprises a Teflon® or a Kapton® thin film. As discussed above under definitions, Teflon® and Kapton® thin films are at least somewhat thermally conductive and are very high heat resistant, making these films useful as coverings for the TIM portion of a flexible heat transfer die. In certain examples, a Teflon® or Kapton® thin film has a thickness of from about 0.001 inch (1 mil, 0.254 mm) to about 0.005 inch (5 mil, 0.127 mm). In other examples, a Teflon® or Kapton® thin film has a thickness of 0.003 inch (3 mil, 0.0762 mm). As per the fabric embodiments, a Teflon® or Kapton® thin film can be adhered around a TIM portion. The TIM portion may be disposed between two sheets of Teflon® or Kapton® thin film that are adhered together by heat and/or adhesive to encapsulate the TIM. In these instances, one sheet may be Teflon® and one sheet Kapton®, with either side intended as the contact side for the indicia transfer processes, or both sheets may be the same material, Teflon® or Kapton®.

In various embodiments, a portion of TIM is enclosed by a sheet of fabric on one side of the TIM and a sheet of Teflon® or Kapton® thin film on the other side of the TIM, laminated together. In other embodiments, all but one face of the TIM is covered in non-thermally conductive reinforcement material whereas just the remaining face is covered in a portion of Teflon® or Kapton® thin film.

In various embodiments, the reinforcement material comprises an insulative silicone rubber pad. A silicone rubber pad for use herein might be typically be used for cushioning, gaskets, and weather seals. Silicone pads are available as solid silicone, silicone sponge and silicone foam. The solid silicone pad is usable herein as a reinforcement material in a flexible heat transfer die. Descriptions of silicone pads that find use herein may be found, for example, at www.stockwell.com.

In various embodiments, silicone pads for use herein have a durometer Shore A hardness ranging from about 10 to about 70. In various embodiments, a silicone pad having a Shore A hardness of about 60 is used. The pad may have a thickness of from about 0.020 inches (0.5 mm) to about 0.25 inches (6.35 mm). In various embodiments, a solid silicone pad having a thickness of about ⅛ inch (about 3 mm) is used. In other examples, a solid silicone pad having a thickness of about 0.04 inches (1 mm) or 0.079 inches (2 mm) is used. The thickness of the silicone pad reinforcement material may or may not be the same as the TIM material. In various embodiments, a planarization process may be used to obtain uniform thickness between TIM and silicone pad reinforcement.

As described above for the fabric reinforcement material, the silicone pad also provides mechanical support to the TIM portion in a flexible heat transfer die. Also, the pad for the flexible heat transfer die can be cut to a width and length that fits around the desired transfer pad of a pad printing machine, and a silicone pad, for example, has enough flexibility that it can be draped around the transfer pad and fastened in place in similar fashion to the fabric reinforced embodiments of the flexible heat transfer die. Assemblies resulting from the combination of silicone pad reinforced heat transfer die and the pad printing transfer pad would still have the general appearance of assembly 400 in FIG. 4.

In various embodiments, a window or well may be cut into a silicone pad, such as by die cutting with a sharp die, or by ablating away material by laser ablation, or by molding a silicone rubber into a desired shape, such as having a recess or well molded therein. The silicone pad cut from stock or molded from curable silicone rubber may be about ⅛ inch (about 3 mm) thick, about 4-8 inches (102-203 mm) in width, and about 6-12 inches (152-305 mm) in length (but can vary to any size depending on the size of the transfer pad that it will be attached to). The size of the window or the well may be about 1-2 inches (25.4-51 mm) by about 3-6 inches (76.2-152.4 mm) and centered in the pad. The window or the well may then be filled in with a cure in place TIM material, such as a two-component room temperature curable resin. Once the TIM is cured, the silicone pad material provides a physical barrier to deformation and migration of the TIM outside the perimeter of the window area. If the window was purposely not cut all the way through the thickness of the silicone pad, then no further reinforcement of the backside of the pad behind the TIM is needed. However, if a window was cut all the way through the thickness of the silicone pad, then the backside of the cured TIM, thus exposed, can be covered with a layer of RTV silicone rubber adhesive, which is then cured, or a sheet of reinforced fabric, or a portion of Teflon® or Kapton® thin film. The exposed side of the TIM can be left as is ("open faced") or covered with fabric, a layer of RTV silicone rubber adhesive, or a portion of Teflon® or Kapton® thin film. The resulting flexible heat transfer die comprising TIM and a surrounding silicone pad, with or without additional reinforcement as described, may then be draped around the contact side of a pad printing machine transfer pad and fastened to the platform base of the transfer pad on opposite sides to secure it thereon (see FIG. 4 and the corresponding discussions herein). The resulting assembly is then used in a hot-stamping process as described herein. In other embodiments, the resulting flexible heat transfer die comprising TIM and a silicone rubber pad may be appropriately sized/trimmed and secured circumferentially around a roller of a roll-on hot-stamping machine.

In various embodiments, the window cut all the way through the thickness of the silicone pad can first be filled with a layer of RTV silicone adhesive and cured, e.g., to 1 mm in thickness, leaving a fillable recess. Then the TIM can be added to the well, on top of the layer of cured RTV silicone, and then cured. The flexible heat transfer die can then be reinforced further with optional sheets of fabric, RTV silicone adhesive, and/or a Teflon® or Kapton® thin film.

In various embodiments, a window can be cut through the silicone pad, or a well can be recessed into the pad, and the window or the well may be filled in with a sheet of TIM cut to size so that it fits the window or the recess. The flexible heat transfer die can then be reinforced further with optional sheets of fabric, RTV silicone adhesive, and/or a Teflon® or Kapton® thin film.

In various embodiments, laser ablation is used to cut intricate recesses into the silicone pad, such as in the form of lettering or a design like a logo. The ablated areas need not go through the entire thickness of the silicone pad. The laser may also be used to ablate all the area surrounding the lettering or design such that the lettering or design is left on a raised portion of the pad near the center of the pad. This island may be rectangular or square shaped, or any other shape to accommodate the design. The recesses are then filled in with a curable TIM material, such as a two-component room temperature curable elastomeric TIM resin, and then cured to form the flexible heat transfer die. In various embodiments, the top of the lettering or design may be planarized, such as by laser ablation. This process can remove irregularities that may have resulted from inconsistent filling of each of the intricate recesses in the pad. The exposed TIM having this graphics pattern may be covered with a sheet of fabric, RTV silicone adhesive, or a Teflon® or Kapton® thin film, or left open-faced and unprotected. This embodiment is discussed in the EXAMPLES with reference to FIG. 3.

As with the other embodiments, the resulting flexible heat transfer die may then be draped around the contact side of a pad printing machine transfer pad and fastened to the platform base of the transfer pad to secure it thereon (see FIG. 4 and corresponding discussions herein). The resulting assembly is then used in a hot-stamping process as described herein.

2. Flexible Heat Transfer Die—Internally Heated:

In various embodiments, a flexible heat transfer die that is internally heated comprises: (A) a thermal interface material (TIM); (B) a reinforcement material in contact with the TIM; and (C) an electrical heater in contact with, or in close proximity to the TIM. In various embodiments, an internally heated flexible heat transfer die comprises the externally heated flexible heat transfer die described above, with an electrical heater disposed in contact with, or in close proximity to the TIM portion. In various embodiments, being "in close proximity to" means that the electrical heater is close enough to the TIM so that the heater can bring the TIM up to a desired temperature and maintain that temperature throughout an indicia transfer process. In general embodiments, "in close proximity to" may mean that only a thin sheet of reinforcing fabric or a film separates the TIM from actually physically contacting the heater. In various embodiments, the electrical heater may be adhered to one side of the TIM with heat transfer adhesive or tape. In various operations, the internally disposed electrical heater substitutes for the external heat source, such as a hot plate.

Both the TIM and the reinforcement materials that find use in an externally heated flexible heat transfer die according to the present disclosure have been described in detail above, and can be the materials and options used in the internally heated flexible heat transfer die. For the internally heated version of the flexible heat transfer die, the electrical heater comprises a flexible heat blanket, e.g., an electrical silicone blanket, which is disposed in contact with the TIM, or in close proximity to the TIM, so that heat is transferred from the heater into the TIM.

Stated another way, in various embodiments, a flexible heat transfer die in accordance with the present disclosure comprises: a thermal interface material (TIM); a reinforcement material in contact with the TIM; and optionally, an electrical heater disposed in contact with, or in close proximity to, the TIM. Being an optional element, if the electrical heater is absent, the flexible heat transfer die is externally heated. If the optional electrical heater is present, the flexible heat transfer die is internally heated.

With reference now to FIG. 6, an internally heated flexible heat transfer die 600 comprises a portion of TIM 610 secured between two layers 601a/601b of reinforcement material (e.g., reinforcing fabric layers per FIGS. 1A-1B); and an electrical heater 616 disposed in contact with, or in close proximity to, the TIM portion 610. In the embodiments illustrated in FIG. 6, the electrical heater 616 may comprise a flexible silicone blanket having electrical connections 617 for the electrical power supply, and the electrical heater 616 may be secured to the other elements of the flexible heat transfer die 600 by enclosing the heater 616 inside a pouch formed from an additional layer 602 of reinforcing material laminated around three of its four edges onto the reinforcing layer 601a to form the pocket as illustrated.

In various embodiments, the electrical heater 616 internally heats the TIM 610 in the flexible heat transfer die and maintains the TIM at a steady state target temperature appropriate for indicia transfer, making the external heat source (e.g., hot plate 585 in FIG. 5) component of the modified pad printing machine unnecessary. In various embodiments, the target temperature for the TIM 610, heated by the electrical heater 616, is from about 375° F. (191° C.) to about 475° F. (246° C.), or from about 400° F. (204° C.) to about 425° F. (218° C.), and so the electrical heater 616 is chosen and positioned relative to the TIM portion 610 to maintain a target temperature about in these ranges of temperatures. Other variables that can be considered for maintenance of a steady state temperature in the TIM include, but are not limited to, magnitude of the voltage and/or current supplied to the electrical heater, duration of the power supplied to the heater, the optional use of a thermostatic control, and the type of material optionally separating the TIM and the electrical heater from direct physical contact, e.g., thermally conductive adhesive or tape, or poorly or even non-thermally conductive fabrics or films. In various embodiments, the electrical heater is continually powered during an indicia transfer process. In other embodiments, the electrical heater is intermittently powered during an indicia transfer process, such as through timers and/or thermostats.

An electrical heater for use herein may comprise a silicone rubber heater or other type of thin, flexible heater. Such heaters may operate on either AC or DC power, and the appropriate power supply is thus configured to power the electrical heater and to maintain a desired target temperature for the TIM. Non-limiting examples of electrical heaters include the BRISKHEAT® line of Silicone Heating Blanket available from Grainger, Lake Forest, Ill., USA; the TEMPCO® line of Silicone Heating Blanket available from Grainger, Lake Forest, Ill., USA; the TUTCO® line of Silicone Rubber Heaters available from Farnam Custom Products, Arden, N.C., USA. Such silicone rubber heaters may have thicknesses of from about 0.03 inches (0.76 mm) to about 0.06 inches (1.5 mm). These companies provide custom heaters for when a particular shape, size and/or thickness of electrical heater is needed. In FIG. 6, the heater 616 of the internally heated flexible heat transfer die comprises a square paddle shape, dimensionally proportioned to the pocket that it fits into, but this particular shape is not limiting. Other shapes and sizes of an electrical heater are within the scope of the present disclosure. In various embodiments, the electrical heater may be sized similar to the TIM portion, or larger or smaller as needed.

3. Integrated Flexible Heat Transfer Die:

In various embodiments, an integrated, externally heated flexible heat transfer die comprises: (A) a thermal interface material (TIM); and (B) a reinforcement material in contact with the TIM, wherein the reinforcement material comprises a cured elastomeric material molded around at least a portion of the TIM. In various embodiments, an integrated flexible heat transfer die is in the physical form of an ink transfer pad of a pad printing machine, as discussed herein. An integrated heat transfer die is a streamlined version of, and takes the place of, an assembly comprising a transfer pad draped with an externally heated flexible heat transfer die. In general, an integrated flexible heat transfer die comprises a transfer pad and a portion of TIM integrated as least partially within the dimensions of the transfer pad. In various embodiments, an integrated flexible heat transfer die comprises a contact side that is uniformly smooth, with no transition between the cured elastomeric portion and the exposed TIM portion.

As understood in reference to FIGS. 8A-8C, a portion of TIM suitable for use in an integrated flexible heat transfer die has a unique shape that promotes inclusion and securement within a molded transfer pad. FIG. 8A shows a perspective view of an embodiment of a portion of TIM usable in an integrated flexible heat transfer die. The TIM portion 800 is molded in the particular shape illustrated, or any other appropriate design, by using a cure in place thermally conductive elastomeric gel in a multi-piece mold that allows removal of the cured TIM part in spite of the various curvatures and protrusions in the design. In various embodiments, a portion of TIM 800 suitable for use in an integrated flexible heat transfer die comprises at least one protrusion 805 to assist in securing the TIM portion partially in the molded elastomer of the integrated flexible heat transfer die. Optionally, the TIM portion 800 may further comprise any number of upstanding projections 807, such as in the form of ribs, textures, pegs, tubes, cones, pyramids, and the like. TIM portion 800 optionally comprises a curvature or a shape 826 that substantially mirrors the curvature and shape of the contact side of the desired transfer pad (e.g., a loaf-shape transfer pad having curvature on the contact side of the pad).

With reference to the side view illustrated in FIG. 8B, the TIM portion 800 comprises at least one protrusion 805 having an undercut surface 806 under which curable material can flow in the molding of the integrated flexible heat transfer die. Such an undercut helps hold the TIM portion 800 secure within the integrated flexible heat transfer die in spite of hundreds to thousands of repeated deformations on the contact side of the integrated die. The optional pegs 807 or other upstanding projections also aid in retaining the TIM portion 800 within the integrated flexible heat transfer die. As shown in FIG. 8B, the TIM portion 800 for use in an integrated flexible heat transfer die has a thickness "x," which can be the same or similar thickness to the TIM used in an internally or externally heated flexible heat transfer die having a sheet-like or a pad-like configuration. Thus, in various embodiments, x may be from about 1 mm to about 10 mm. In various embodiments, x may be from about 1 mm to about 5 mm. In various embodiments, x may be from about 1 to about 3 mm. Further, the TIM portion, once molded and cured, may have a hardness up to about 60 A.

As discussed below, the durometer hardness of the TIM material need not be identical to the durometer of the reinforcing elastomeric material molded around it, although the durometer hardness may be substantially similar or even identical. In various embodiments, the molded elastomeric portion of the integrated die has a durometer hardness of about 60 A, and the TIM portion of the integrated die has a durometer hardness of from about 20 A-30 A, from about 45-50 A, or 30 A. In various embodiments, the molded elastomeric portion of the integrated die has a durometer hardness of about 60 A, and the TIM portion of the integrated die has a durometer hardness of 60 A and a thermal conductivity of about 35-45 W/m-K.

With reference now to the top view illustrated in FIG. 8C, the TIM portion 800 is seen to comprise at least one protrusion 805, and optionally any number of upstanding projections 807 that may assist in securing the TIM portion 800 into the integrated flexible heat transfer die. The TIM portion 800 is molded in a length 1 and a width w. The length and width of the TIM are chosen per the criteria explained above, (e.g., comparable to the size of the indicia to be transferred to an object in need of decoration). Therefore, the TIM portion 800 here, for use in an integrated flexible heat transfer die will have substantially similar proportions to a portion of TIM used within an internally or externally heated flexible heat transfer die having a sheet-like or pad-like appearance.

FIG. 9 illustrates a method and the articles usable to manufacture an integrated flexible heat transfer die in accordance with the present disclosure. As illustrated in FIG. 9, a previously molded portion of TIM 950, (e.g., part 800 illustrated in FIGS. 8A-8C), is placed and optionally fixed to the bottom of recess 930 of mold 900. The mold 900 includes both a flat portion 948 and the recess 930. The recess defines the shape and dimensions of the integrated flexible heat transfer die, and is essentially the same mold one would use to make a transfer pad for a pad printing machine. So, in various embodiments, the mold might be used to produce a loaf-shaped or other shaped silicone rubber or other elastomeric transfer pad. The TIM portion 950 may be laid against the bottom of the recess 930 having a curves so as to make a loaf-shaped or another shaped transfer pad. The shape of the mold may be square, rectangular, round, or another shape, depending on the desired shape for the transfer pad. When a portion of TIM is present, the mold is used to produce an integrated flexible heat transfer die rather than a standard ink transfer pad.

The TIM portion 950 may be adhered to the bottom of the recess 930 with an adhesive, or even with petroleum jelly as a sealant. The idea is to prevent liquid elastomer poured into the mold from going under the TIM portion 950 and thus between the TIM portion and the bottom surface of the mold. After the TIM portion 950 is suitably fixed to the bottom of the recess 930, silicone rubber or other curable elastomeric material is put in the mold. After curing, the integrated flexible heat transfer die thus molded can be removed. Optionally, a piece of wood or other suitable platform base material can be fitted onto the top of the filled mold, in contact with the uncured elastomeric material, so that it becomes secured to the molded transfer pad opposite the TIM/contact side, usable for mounting the integrated flexible heat transfer die to a pad printing machine, in place of the standard ink transfer pad.

In various embodiments, a condensation cure, or addition cure silicone rubber is cast in the mold to make the integrated heat transfer die. Such materials may be obtained from Dow Corning®, Midland, Mich., USA, or other manufacturers. For example, condensation cure silicone rubber 3112 and 3120 from Dow Corning® cure to 60 A durometer hardness. Other silicone rubbers, condensation cure or addition cure, provide durometer hardness of from about 5 to about 60 Shore A durometer hardness. In various embodiments, the durometer Shore hardness of the TIM portion in the integrated flexible heat transfer die is matched to the after-cure hardness of the silicone rubber cast around the TIM portion. In various embodiments, an integrated flexible heat transfer die comprises TIM having a durometer hardness of about 60 A and a silicone rubber cast around at least a portion of the TIM, the silicone rubber having an after-cure durometer hardness of also about 60 A. In various embodiments, the durometer Shore hardness of the TIM portion in the integrated flexible heat transfer die is different from the after-cure hardness of the silicone rubber or other elastomer cast around the TIM portion. In various embodiments, the durometer Shore hardness of the TIM portion in the integrated flexible heat transfer die is less than the after-cure hardness of the silicone rubber or other elastomer cast around the TIM portion.

With reference to FIG. 10, a complete integrated flexible heat transfer die 1000 is illustrated, showing a perspective view of the integrated flexible heat transfer die 1000 upside down from its actual use orientation. On the contact side (top side in this view), the exposed face of the TIM portion 1050 is observable. In various embodiments, the TIM portion 1050 is left uncovered and exposed (i.e., "open faced"). The integrated flexible heat transfer die 1000 may further comprise a platform base 1065, such as comprising metal or wood, usable to attach the complete integrated flexible heat transfer die 1000 to an arm or piston of a pad printing machine, (explained in the context of FIG. 5).

As mentioned previously, an integrated flexible heat transfer die can also be made by beginning with a complete standard ink transfer pad, such as a commercially sourced transfer pad from the pad printing industry. In this case, a portion of the contact face of the transfer pad is ablated away, e.g., with a laser, to form a recess that can be filled in with a cure in place thermally conductive elastomeric gel. However, an advantage to incorporating a pre-molded TIM portion, such as TIM portion 800 in FIGS. 8A-8C, into the integrated flexible heat transfer die, rather than molding TIM in a cut-away recess, is that protruding features such as those illustrated in FIGS. 8A-8C can be molded in as part of the TIM portion design, and these features on the TIM can assist in keeping the TIM portion secured within the integrated flexible heat transfer die structure as the die is repeatedly deformed thousands of times during indicia transfer.

4. Assembly and Apparatus for Hot-Stamping of Indicia Using an Externally Heated Flexible Heat Transfer Die:

In various embodiments, an assembly comprises a transfer pad and a flexible heat transfer die draped around the transfer pad. In various embodiments, an apparatus comprises a pad printing machine and an assembly attached to a movable arm of the machine, the assembly comprising a transfer pad and a flexible heat transfer die draped around the transfer pad. An assembly in accordance with the present disclosure is illustrated, for example, in FIG. 4. An apparatus comprising such assembly is illustrated, for example, in FIG. 5.

As discussed, a elastomeric transfer pad, such as a silicone rubber block, is well-known as an accessory to a pad printing machine. Any transfer pad may be used in various embodiments. For example, the transfer pad may be chosen based on its hardness, size and shape, and to a lesser extent, on the nature of the materials it is constructed from.

In various embodiments, a transfer pad for use herein comprises a block of silicone rubber or other elastomer molded on a platform base, such as comprising wood. The transfer pad may have a durometer hardness ranging from about 30 Shore 00 hardness to about 70 Shore A hardness. In various embodiments, the transfer pad has a durometer Shore A hardness of around 60 ("60 A"). The hardness of the transfer pad may be chosen somewhat empirically, meaning that by trial and error a certain hardness range may be found suitable for decorating an uneven surface. Surfaces of plastic articles that have large stepwise gradations, large curvatures, tubular structures, and the like, may require a softer transfer pad that can conform to all intricacies of the uneven surface, such as even wrapping 180° around a tubular structure to be decorated. Further, fragile plastic articles, including articles having a hollow interior just below the surface to be decorated, may require use of a softer transfer pad to avoid crushing the article during the hot-stamping process. In various embodiments, a 60 A transfer pad has been shown able to conform a printed ink transfer 180° around a polyethylene tubular structure measuring about 1½ inches (38 mm) to about 2 inches (51 mm) in diameter. However, thicker or thinner plastic structures may require an adjustment to the durometer hardness of the transfer pad.

The thickness, or height, of the transfer pad may be chosen based on the surface to be decorated, to provide enough material to conform to the irregularities or contours of the surface. For example, to conform a transfer pad 180° around a tubular structure having a diameter of about 2 inches (51 mm) will necessitate selecting a transfer pad having a height of at least about 1½ inches (38 mm) so that there is enough pad material to conform around the tube without the pad being compressed flat and all the way down to its base.

A length and a width for the transfer pad may be chosen based on the size of the printed ink indicia transfer to be used in the decorating process. For example, some decoration may be very small, e.g., measuring just a few inches in length and width, and thus a correspondingly small transfer pad can be used. In other examples, the indicia may be large e.g., at least a foot or so in length and width or diameter, and thus a correspondingly large transfer pad can be used. In some instances, a custom transfer pad may be required, meaning a size and/or shape that is not typically provided by suppliers of pad printing accessories. In this case, a transfer pad can be made by shaping a mold around a plywood base and filling the mold with elastomeric silicone rubber.

It is important to note that there is no size limitation to the current methods, apparatus and systems herein. If a transfer pad is required that cannot fit into a commercially available or modified pad printing machine, such as apparatus 575 in FIG. 5, a custom machine or robot can be fabricated that can repeatedly cycle a large pad from an external heat source, e.g., a hot plate, to the article to be decorated, or the process can be done entirely manually. These possibilities allow decorating very large plastic items such as storage tanks. A plastic tank, for example, may measure 8 feet (2.4 meters) to 10 feet (3 meters) in height and 3-4-feet (0.91-1.22 meters) in diameter, with no apparent way to permanently decorate it with large indicia. However, the methods, apparatus and system herein can be adapted to hot-stamp such a large tank with indicia, by fabricating a large transfer pad and a correspondingly large flexible heat transfer die to drape thereon, and a robot that can cycle the large assembly from an external heat source, e.g., a hot plate, to the tank. In this example, the indicia may be first applied to the curved surface of the tank, e.g., with an adhesive, before hot-stamping, rather than trying to index the transfer into position from a roll. For just a few instances of hot-stamping, a large assembly can be heated, either by contacting the assembly with an external heat source, e.g., a hot plate, or by applying heat from another source like an infrared or other radiant, and the assembly can be hoisted and pressed against the large article where indicia has been applied previously.

With reference now to FIG. 4, and in various embodiments, an assembly 400 comprises a loaf-shaped transfer pad 460 and a wood platform base 465, e.g., a piece of plywood about ½ inch (12.7 mm) to 1 inch (25.4 mm) thick. The wood base 465 allows use of thumbtacks or other fasteners, such as metal strips 425 held down with screws 426 as illustrated, to secure a flexible heat transfer die 405 to the pad printing transfer pad 460. For example, and as shown in FIG. 4, strips of metal bracketing 425 may be attached with wood screws 426 to the wood base 465, with an edge of the fabric or rubber pad portion 440 of the flexible heat transfer die 405 tucked under this strip prior to tightening the screws. In other examples, threaded inserts can be embedded in the edges of the wood so that machine screws, rather than wood screws, can be used in conjunction with the metal strips to reversibly secure the flexible heat transfer die to the pad printing transfer pad. As explained, the flexible heat transfer die 405 is engineered to a size that allows draping the heat transfer die 405 all the way around the contact side of the transfer pad 460 so that the flexible heat transfer die 405, and not the pad printing transfer pad 460, contacts the article to be decorated, and such that the TIM portion 410 is positioned at the contact side of the transfer pad 460, such as illustrated in FIG. 4. One edge of the flexible heat transfer die can be fastened to one edge of the wood base. The flexible heat transfer die can then be draped around the contact face of the transfer pad and fastened to the opposite edge of the wood base to appropriately position the TIM portion 410 of the flexible heat transfer die 405 directly adjacent the contact side of the transfer pad 460. In various embodiments, the flexible heat transfer die 405 can be loosely draped around the transfer pad 460, and there doesn't appear to be any advantage to tightly fitting the heat transfer die to the pad printing transfer pad. Thus, during various steps in the hot-stamping process, the flexible heat transfer die may appear to dangle off from the contact surface of the transfer pad (as shown in FIG. 4). However, the dangling flexible heat transfer die will come into contact with the contact side of the transfer pad when the assembly 400 is pressed against an external heat source, e.g., a hot plate, and when it is pressed against the indicia transfer and the article to be decorated.

For decorating a plastic article, an assembly 400, such as illustrated in FIG. 4 and comprising the pad printing transfer pad 460 and the flexible heat transfer die 405 attached thereon, is fitted to a moving arm and/or piston configuration of a conventional pad printing machine, as illustrated in FIG. 5, and explained in more detail in the EXAMPLES. In general, and in reference to FIG. 5, a modified pad printing machine 575 comprises a hot plate 585, such as positioned in the location where an ink tray may have resided, a piston 595 for moving assembly 500 vertically up and down, and tracks 596 to guide the assembly 500 on the moveable arm 593 in a horizontal motion to either a position over the hot plate 585 or over the part 565 to be decorated in an indicia transfer operation.

In various embodiments, the assembly 400 in FIG. 4, rather than being attached to the apparatus 575 in FIG. 5, is instead moved manually between a heat source and a hot-stamping indicia transfer step when the size of the article to be decorated is either too large (e.g., the article wouldn't fit in, or sit adjacent to, a pad printing machine) or the number of articles to be decorated is simply too few, (making it cost prohibitive to purchase a pad printing machine 575 for an automated process such as in FIG. 5 when there are just a few articles to be decorated).

5. Assembly and Apparatus for Hot-Stamping of Indicia Using an Integrated Flexible Heat Transfer Die:

In various embodiments, the integrated heat transfer die, since it does not comprise an internal electrical heater, is used in the same way as the externally heated flexible heat transfer die having a sheet-like or pad-like configuration, as detailed above, except that the assembly is just the integrated heat transfer die by itself, without the need to drape a flexible heat transfer die around a transfer pad. In various embodiments, a modified pad printing machine having an external heat source, e.g., a hot plate, (e.g., 585 in FIG. 5) is equipped with an integrated heat transfer die rather than a conventional ink transfer pad. In other words, the apparatus 575 in FIG. 5 would not have assembly 500, but instead would just have an integrated flexible heat transfer die which would have the same outward appearance as ink transfer pad 560. In operation, the integrated heat transfer die is cycled between the hot plate 585 that externally heats the TIM portion of the integrated heat transfer die and the stamping operation that decorates the object to be decorated.

6. Assembly and Apparatus for Hot-Stamping of Indicia Using an Internally Heated Flexible Heat Transfer Die:

With reference to FIG. 7, in various embodiments, an assembly 700 for hot-stamping indicia onto articles is used in conjunction with a stamping machine, for example, a simple press. As illustrated in FIG. 7, assembly 700 comprises an internally heated flexible heat transfer die 705 draped around and fastened to a transfer pad 760 as described for the externally heated heat transfer die. In various embodiments, the salvage material (e.g., reinforced fabric layers 701a/701b) on the internally heated flexible heat transfer die 705 may be tucked under and secured by metal brackets 725 to the platform base 765 by the appropriate screws or bolts. As can be seen in FIG. 7, the internally heated flexible heat transfer die 705 comprises a TIM portion 710, laminated between reinforcement material layers 701a and 701b. The flexible electrical heater 716 is seen held within a pouch 702 laminated to the outside reinforcement material layer 701a. The electrical wires 717 of the electrical heater 716 can be connected to the appropriate AC or DC power supply. The assembly 700 further comprises metal brackets 725 and associated screws 726 to fasten the opposite salvage edges of the flexible heat transfer die 705 to the transfer pad 760. The TIM portion 710, and the electric heater in contact or in close proximity thereof, are necessarily positioned just under the contact side of the ink transfer pad 760.

The assembly 700 in FIG. 7 can be mounted to any press. Therefore, at least one advantage to using an internally heated assembly 700 rather than an externally heated assembly such as assembly 400 in FIG. 4, is that a pad printing machine (e.g., 575 in FIG. 5) having all the horizontal movements is not needed. As explained in more detail in the EXAMPLES, use of an externally heated assembly (e.g., assembly 400 in FIG. 4) on a modified pad printing machine, comprising an external heat source, e.g., a hot plate or radiant heater, for externally heating the flexible heat transfer die, requires movement of the assembly in four directions, vertically up and down, and horizontally backwards and forwards. The reason for all the movement is that the assembly, such as 500 in FIG. 5, has to be moved back to a position over the hot plate 585 guided by the tracks 596, then down against the hot plate 585 by the piston 595 to pick up heat, then forward to a position over the article 565 to be decorated, and then down against the article 565 by the piston 595 to apply heat and pressure to decorate the article 565. With an internally heated assembly (e.g., assembly 700 in FIG. 7), however, a simple press can be utilized since the assembly 700 need only be moved up and down vertically, without any need for horizontal movement backward and forwards to access an external heat source, e.g., a hot plate, to pick up heat. All the simple press requires is an electrical or pneumatic piston to move the assembly 700 vertically up and down. In an automated system, the press may further comprise a roll feed and indexer for indexing indicia from a roll of indicia over the article to be decorated. The press does not need to supply heat, although the press may be equipped with the necessary power supply (AC/DC) to power the electrical heater in the internally heated flexible heat transfer die. The wires 717 from the internally heated assembly 700 (FIG. 7) will not tangle during this simplified automated indicia transfer operation because the movement of assembly 700 is limited only to an up and down motion.

7. Methods of Decorating Plastic Articles Having Uneven Surfaces or Hollow or Crushable Structure:

A. The Single-Cycle Process:

In general, transfers comprising printed indicia are applied to the surface of preformed polyethylene or polypropylene parts having uneven surfaces or crushable hollow structures with adequate heat, time and pressure to fuse the indicia into the surface of the part. The printed ink transfers for use herein may be identical to those disclosed previously in U.S. Pat. Nos. 8,349,917 and 9,296,243. In various embodiments, the transfers may be printed on a continuous roll having uniform spacing between each transfer so that the transfers can be indexed into position for each printing cycle, such as in a roll-to-roll winding/unwinding configuration.

In various embodiments, the high pressure/high temperature processes described in the '917 and '243 patents may benefit by use of an externally heated flexible heat transfer die, such as 100 illustrated in FIG. 1B, draped around the hard platen die of the hot-stamping machine. Draping an externally heated flexible heat transfer die such as 100 in such a way improves the previously disclosed processes by reducing sink marks and other defects seen in graphics transfer using a flat die stamp. Such high pressure hot-stamping may be improved by draping an externally heated flexible heat transfer die around the platen, wherein the TIM in the draped die has a durometer hardness of from about 60 A to about 70 A, and thickness from about 4 mm to about 6 mm. However, decorating articles having uneven surfaces or crushable structures benefit by using the assemblies disclosed herein comprising padded configurations rather than hard patens. Even with a flexible heat transfer die covering the hard platen and die, such an arrangement remains unsuitable to decorate uneven surfaces or surfaces over a hollow structure that can be crushed.

In various embodiments, and exemplified in the illustration of FIG. 5, the preformed plastic article 565 is placed in position, such as through use of a jig 568, under the assembly 500 comprising the transfer pad 560 and the externally heated flexible heat transfer die 505, with the printed ink transfer 514 indexed between the part 565 and the assembly 500. The assembly 500, externally heated by repeated cycles of contact with a hot plate 585, is then compressed on the transfer 514 and the part 565 for sufficient time to conform the transfer to the part, fuse the transfer into the surface of the part 565, and separate it from the carrier sheet. As discussed above, an assembly such as 700 in FIG. 7 comprising an internally heated flexible heat transfer die can be attached to a simple press, since accessing a hot plate is not necessary.

As illustrated in FIG. 5, transfers 514 can be applied by a commercial pad printing machine 575 that has been modified by replacing the ink tray, which is not needed here, with a heat source, such as a hot plate 585. The hot plate 585 may be appropriately sized so that it is larger in surface area than the TIM portion 510 of the flexible heat transfer die 505 to be used in the hot-stamping process. The hot plate 585 may be heated at from about 250° F. (121° C.) to about 600° F. (316° C.), or at a temperature sufficient enough to maintain the TIM portion of the flexible heat transfer die at from about 375° F. (191° C.) to about 475° F. (246° C.). In various embodiments, the hot plate 585 is maintained at about 400-450° F. (204-232° C.) such that a steady state temperature of about 400-425° F. (204-218° C.) can be maintained in the flexible heat transfer die 505. The platen and die as described in the '917 and '243 patents are thus replaced by a cushioned assembly such as 500 as described herein, comprising a pad printing transfer pad 560 and a flexible heat transfer die 505 draped around and covering the transfer pad 560. In this way, objects having textured or contoured surfaces (such as the rounded top face of part 565) can be decorated. In various embodiments, the thermal ink transfers 514 can be on a roll 513 and indexed over the article to be decorated in a roll-to-roll configuration.

In various embodiments, a method of applying indicia onto a surface of a plastic article comprises: heating a flexible heat transfer die to a target temperature; and conforming the flexible heat transfer die to the surface of the plastic article while a printing ink transfer comprising the indicia is disposed between the heat transfer die and the surface of the plastic article. In various embodiments, the flexible heat transfer die comprises an externally heated flexible heat transfer die, and the method includes the external heating of the flexible heat transfer die by momentary contact on a hot plate. In other embodiments, the flexible heat transfer die comprises an internally heated flexible heat transfer die, and the method further comprises supplying sufficient voltage and/or current to an electrical heater located in the internally heated flexible heat transfer die so that the flexible heat transfer die is maintained at a desired target temperature during the indicia application process.

In various embodiments, a method of applying indicia onto a surface of a plastic article comprises: heating an assembly comprising a pad printing transfer pad and a flexible heat transfer die draped around and covering the transfer pad to a target temperature; and conforming the assembly to the surface of the plastic article while a printing ink transfer comprising the indicia is disposed between the assembly and the surface of the plastic article. In various embodiments, the assembly is externally heated, such as by momentary contact of the contact face of the assembly with an external heat source, e.g., a hot plate, or by moving the assembly into close proximity with a radiant infrared heater. In other embodiments, the assembly is internally heated, and the method further comprises supplying sufficient voltage and/or current to an electrical heater located in the internally heated flexible heat transfer die of the assembly so that the flexible heat transfer die portion of the assembly is maintained at a desired target temperature during the indicia application process In various embodiments, the method is automated to allow performance in repeating cycles, wherein each cycle comprises: a first position with the externally heated assembly raised above the plastic part, a second position with the assembly raised above the hot plate, a third position with the assembly in contact with the hot plate, the second position with the assembly raised above the hot plate, the first position with the assembly raised above the plastic part, and a forth position with the assembly in contact with the plastic part and the thermal transfer positioned between the assembly and the plastic part. Repeating this cycle ensures the flexible heat transfer die of the assembly is reheated each time by contact with the hot plate prior to engaging in a cycle of hot-stamping of indicia. The robotics of the pad printing machine ensure repetition of this cycle, allowing for adjustment in dwell time at each position and the pressure at which the assembly is forced against the plastic part.

In various embodiments, the dwell time during which the assembly is placed in contact with the hot plate is from about 0.5 seconds to about 10 seconds. In various embodiments, the dwell time is from about 1 to about 5 seconds.

In various embodiments, the dwell time during which the assembly is compressed against the indicia transfer and plastic part is from about 0.5 seconds to about 10 seconds. In various embodiments, the dwell time is from about 1 to about 5 seconds.

The other positions of the cycle have dwell times that are less critical. The time that the assembly may stop above the article or above the hot plate may be adjusted to give time to exchange the printed plastic article with an article to be printed, and/or to provide time to index the next printed ink transfer into place. These other positions may have dwell times of from about 0.5 to about 10 seconds each.

In various embodiments, the flexible heat transfer die in the assembly can reach and maintain a steady state temperature of about 400-425° F. (204-218° C.) due to the nature of the TIM material within the flexible heat transfer die and the frequency and duration of contact between the assembly and the hot plate maintained at a temperature of from about 400-450° F. (204-232° C.). In various embodiments, the flexible heat transfer die in the assembly can reach a steady state temperature of about 400-425° F. (204-218° C.) after about 10-20 cycles, wherein each cycle comprises a contact time of about 1 to about 5 seconds with a hot plate maintained at from about 400-450° F. (204-232° C.).

In various embodiments, the surface of the plastic article is contoured or comprises stepwise gradations in level or is otherwise uneven or non-flat, (meaning that a flat metal platen could not possibly have pressed against all portions of the entire uneven surface to be decorated).

In various embodiments, the surface to be decorated is on a hollow portion of a plastic article. In various embodiments, the surface is on a hollow handle of a preformed article. In some instances, a hollow structure of a plastic article would have been crushed if a platen and hard die were used in a hot-stamping process to decorate the article.

The step of conforming the flexible heat transfer die to the surface of the plastic article to be decorated comprises compressing the assembly comprising the transfer pad and the flexible heat transfer die against the indicia transfer and the article, at a pressure of from about 10 psig (0.069 MPa) to about 1000 psi (6.9 MPa). The compression pressure is achieved by the pad printing machine wherein the pad printing transfer pad is compressed down against the article by a force delivered from the machine. The compression pressure may be adjusted so that the part is evenly decorated but not crushed. The compression pressure may also be adjusted so that the transfer pad is not fully compressed and flattened against its base. Excessive pad pressure here can result in crushing an article to be printed or collapsing texture thereon, but unlike actual pad printing, does not result in distortion of the indicia transferred to the article.

For an integrated flexible heat transfer die, such as 1000 illustrated in FIG. 10, all of the temperature, pressure and dwell time variables can remain the same as per the modified pad printing machine illustrated in FIG. 5 comprising the assembly 500. Regardless that the integrated flexible heat transfer die 1000 in FIG. 10 is streamlined and less complicated than the assembly 500 in FIG. 5, the integrated flexible heat transfer die still requires external heating, and therefore the modified pad printing machine 575 depicted in FIG. 5 remains appropriate for use with the integrated die 1000 (FIG. 10).

For an internally heated assembly, such as assembly 700 in FIG. 7 comprising an internally heated flexible heat transfer die 705 draped around a transfer pad, all of the temperature, pressure and dwell time variables can also remain the same as per the modified pad printing machine illustrated in FIG. 5 comprising the assembly 500. However, the machine can be greatly simplified, and can be a simple press, seeing there is no need for an external heat source, e.g., a hot plate, or the backwards and forwards motion of the assembly to access the heat source. The modified pad printing machine described above can be replaced with a simple press, optionally automated to cycle the internally heated assembly up and down. Further optional automatic can include movement of parts to be decorated and indexing of indicia from a roll of indicia transfers in a roll-to-roll configuration. The electrical wires from a power supply to the flexible electrical heater portion of the assembly simply move up and down with the assembly, without tangling.

B. The Dual-Cycle Process:

In various embodiments, the single-cycle process described above can be modified by splitting the indicia transfer operation into two steps comprising (i) transferring the indicia to the surface of the article to be decorated; and (ii) fusing the indicia into the surface of the article to form the decorated article. Both steps require impression from a heated assembly comprising a flexible heat transfer die and a transfer pad, but each step can be conducted at a temperature lower than the temperature used for the single-cycle stamping operation described above. The two steps are demarcated by physical removal of the carrier sheet, which can be an entirely manual operation conducted by the operator standing in front of the pad printing machine. In various embodiments, the assembly can be heated by compressing it against an external heat source, e.g., a hot plate, or moving the assembly into close proximity with a radiant heat source, or in the internally heated embodiments, the assembly will already be electrically maintained at the appropriate temperature.

The dual-cycle process has several advantages. The advantages are a consequence of the lower temperatures required and the improved fusion of the indicia on highly irregular surfaces, such as textured surfaces. These advantages are made possible by eliminating the carrier sheet in the second step of fusing the indicia into the surface of the article.

In the single-cycle process described above, the carrier sheet of the printed ink transfer (disclosed in the '917 and '243 patents) is stiff and thermally insulating. Because the carrier sheet is stiff, the overall transfer resists conforming perfectly to certain irregularities on a surface, such as texturing. This resistance to conforming to the surface can result in defective transfer of the indicia to the irregular surface. So even though the TIM is very malleable and could conform to practically any surface irregularity with applied pressure, the stiffness of the carrier sheet prevents the malleable TIM to conform the printed ink transfer to the irregular surface. Further, the carrier sheet is thermally insulating, and so the flexible heat transfer die has to be held at about 400-425° F. (204-218° C.) so that enough heat can transfer through the insulative carrier sheet to fuse the particulate polyolefin indicia into the plastic surface. This heat (even ≥ to about 350° F., 177° C.) can distort or warp the carrier sheet, causing the resulting fused indicia decoration to look distorted on the article. The solution to these problems is to eliminate the carrier sheet before the indicia is fused into the surface of the article. Eliminating the carrier sheet allows the malleable TIM to conform the indicia onto the irregular surface, eliminates distortion of the indicia, and allows a lower temperature to be used in the fusion step.

In various embodiments, the dual-cycle process begins with applying a printed ink transfer to the object to be decorated, optionally with the aid of an adhesive. For example, an adhesive may be applied to the article or onto the indicia side of the printed ink transfer prior to application of the transfer to the surface of the article. The adhesive for this purpose may comprise a temporary fixative, such as a rubber cement used for photo mounting. Such an adhesive may comprise a terpene resin and may be only moderately tacky. Typically, an adhesive for application to the indicia comprises an SBS (styrene-butadiene-styrene) or SBR (styrene-butadiene rubber) tackifier resin adhesive. A roll of indicia transfers, such as disclosed in the '917 and '243 patents, may already be provided with this adhesive applied to the indicia side of the roll.

The second step of the dual-cycle process (which is the first heated step of the dual-cycle process) comprises transfer of the indicia from the printed ink transfer to the surface of the article to be decorated. This step may comprise automatically indexing or manually positioning an adhesively coated printed ink transfer between the heated assembly discussed above and the surface to be decorated. The difference from the single-cycle process is that the flexible heat transfer die of the assembly may be heated to only about 300-350° F., (149-177° C.) rather than 400-425° F. (204-218° C.), to effect transfer of the indicia. The assembly with the heated flexible heat transfer die is forced onto the article as before, except that the lower temperature only succeeds in transferring the indicia from the carrier sheet to the surface of the article and not fusion of the indicia into the surface. The dwell time for this step, with the flexible heat transfer die of the assembly heated to only about 300-350° F. (149-177° C.), may be about 2½ seconds. In other embodiments, the temperature can be increased to be between the what is used for the two processes and the dwell time increased accordingly. Thus, a lower temperature requires a longer dwell time whereas a higher temperature requires a shorter dwell time.

In the third step of the dual-cycle process, the carrier sheet that appears attached to the surface of the article is peeled off. The adhesive that was optionally applied to the indicia side of the transfer can ensure that the indicia remains on the surface of the article, whereas the heat that was applied ensures that the indicia is freed from the carrier sheet. As mentioned, the removal of the carrier sheet from the indicia now adhered to the surface may not be easy to automate, although a robotic pick-in-place system can be configured to do so. In various embodiments, the operator of the pad printing machine may simply stand ready to peel off each carrier sheet after the assembly is automatically raised up vertically off the part. When the indicia transfer is in the form of a roll that has already been pre-printed or otherwise coated on the indicia side with a fixative adhesive, the roll-to-roll assembly can be automatically lifted vertically to separate the carrier film roll from the indicia, leaving the indicia on the surface. The roll-to-roll assembly can then be automatically moved laterally to clear the way for the heated transfer pad assembly to come back down again on the indicia as per below. As mentioned, the assembly may be preheated by contact with an external heat source, e.g., a hot plate, or it may be internally heated by virtue of an internally disposed electrical heater and the appropriate power source.

In the fourth step of dual-cycle process (which is the second heated step of the dual-cycle process) the heated assembly is again forced onto the indicia, now adhered to the surface. However, unlike the single-cycle process, there is no intervening insulating and stiff carrier sheet to interfere with the fusion process. This step comprises forcing the heated assembly onto the indicia, with the flexible heat transfer die of the assembly heated again to only about 300-350° F. (149-177° C.), for a dwell time of about 2½ seconds, to melt the particulate polyolefin indicia ink and fuse the indicia into the surface of the article. As mentioned, without the interference from the carrier sheet, which has been removed prior to fusion, the TIM portion of the die conforms with near perfection to the irregular surface, and the heat from the TIM is directly applied to the indicia for a more uniform and complete fusion of the indicia into the surface.

8. Systems for Decorating Plastic Articles Having Uneven Surfaces or Hollow or Crushable Structure:

In various embodiments, a system for applying indicia onto a surface of a plastic article comprises an assembly movable from a position in contact with a heat source to a position over top of an article to be decorated. The assembly may be compressed against the printing ink transfer and the surface of the plastic article. The assembly may comprise a pad printing transfer pad having a contact side and a base opposite the contact side. The assembly may comprise an externally heated flexible heat transfer die draped around the contact side of the transfer pad. The heat source may be maintained at a temperature to heat the flexible heat transfer die of the assembly to a steady state temperature upon repeated contact of the assembly with the heat source. The indicia from the printing ink transfer may be transferred to the surface of the plastic article when the assembly is compressed against the printing ink transfer and the surface of the plastic article.

In various embodiments, compression is achieved by a pad printing machine or other suitable robotics that forces the heated assembly onto the indicia transfer and plastic article.

The system may further comprise an indexing machine capable of indexing the printing ink transfer into a position between the assembly and the surface of the plastic article, wherein the printing ink transfer is part of a roll of identical transfers.

In various embodiments, a system for applying indicia onto a surface of a plastic article comprises a roller assembly moveable from a position in contact with a heat source to a position across the surface of an article to be decorated by rolling. The roller assembly may be compressed against the printing ink transfer and the surface of the plastic article as it is rolled from the heat source and over the article. The assembly may comprise a roller from a roll-on hot stamping machine wrapped with an externally heated flexible heat transfer die as described herein. The heat source may be maintained at a temperature to heat the flexible heat transfer die of the roller assembly to a steady state temperature upon repeated contact of the assembly with the heat source as the roller returns to a starting position. In various embodiments, heaters, such as radiant infrared heaters, may be positioned above the roller, eliminating the need to roll the rollers across a hot plate while maintaining direct contact with the hot plate. The indicia from the printing ink transfer may be transferred to the surface of the plastic article when the roller assembly is rolled across and compressed against the printing ink transfer and the surface of the plastic article.

The system may further comprise an indexing machine capable of indexing the printing ink transfer into a position between the assembly and the surface of the plastic article, wherein the printing ink transfer is part of a roll of identical transfers.

In various embodiments, a system for applying indicia onto a surface of a plastic article comprises an assembly movable vertically down onto an article to be decorated. The assembly may be compressed against the printing ink transfer and the surface of the plastic article. The assembly may comprise a pad printing transfer pad having a contact side and a base opposite the contact side. The assembly may comprise an internally heated flexible heat transfer die draped around the contact side of the transfer pad. The electrical heater contained within the internally heated flexible heat transfer die may be maintained at a temperature to heat the TIM portion of the flexible heat transfer die of the assembly to a steady state temperature. The indicia from the printing ink transfer may be transferred to the surface of the plastic article when the assembly is compressed against the printing ink transfer and the surface of the plastic article.

In various embodiments, compression is achieved by a press or other suitable robotics that forces the heated assembly onto the indicia transfer and plastic article.

The system may further comprise an indexing machine capable of indexing the printing ink transfer into a position between the assembly and the surface of the plastic article, wherein the printing ink transfer is part of a roll of identical transfers.

EXAMPLES

Assemblies and Apparatus:

The apparatus used in the various examples herein comprises a modified pad printing machine with the ink tray replaced in its entirety with a hot plate, such as apparatus 575 in FIG. 5, wherein the conventional transfer pad on a movable arm is replaced by an assembly 500 comprising a transfer pad draped with an externally heated flexible heat transfer die or replaced with an externally heated integrated flexible heat transfer die. In various embodiments, the hot plate of the apparatus may be simply placed on top of the existing ink tray of the pad printing machine to cover it, in which case the ink tray can be left on the machine but left empty of ink. In this way, the assembly comprising a transfer pad draped with the flexible heat transfer die, or an integrated heat transfer die in place of the transfer pad assembly, moves over and down onto the hot plate so that the heat transfer die can pick up heat from the hot plate, maintaining a steady state temperature. In conventional pad printing, the transfer pad, without a flexible heat transfer die wrapped around it or a TIM portion molded or cast therein, moves over and down onto wet ink indicia in an ink tray to pick up the ink and transfer it onto an article to be printed. Without the flexible heat transfer die of the present disclosure, a transfer pad, such as comprising only silicone rubber and no TIM, is entirely unable to pick up and transfer enough heat to transfer indicia from a thermal printing ink transfer onto the surface of a plastic article. A block of silicone rubber alone might reach 400° F. (204° C.) and above. However, since a silicone rubber block lacks the necessary thermal conductivity, it cannot effectively transfer enough heat to fuse the graphics image into the surface of the plastic part.

The transfer pad used with a draped externally heated heat transfer die was a 60 A Shore hardness silicone rubber loaf-shaped transfer pad molded on a plywood base, which is shown for example in FIGS. 4 and 5.

In a suitably modified pad printing machine for use herein, such as apparatus 575 in FIG. 5, a 10-inch (254 mm)×10-inch (254 mm) or larger hot plate 585 may be kept at a surface temperature of about 475° F. (246° C.). As the assembly 500 comprising the externally heated flexible heat transfer die 505 surrounding the ink transfer pad 560 is repeatedly pressed against the hot plate 585 for about 2 to 5 seconds in each printing cycle, it will reach a steady state temperature of about 400° F. (204° C.) after about 10-20 cycles. After a steady state temperature in the externally heated flexible heat transfer die is reached, plastic articles such as 565 may then be decorated in an automated process wherein a part is stamped every several seconds or so. The part to be decorated is placed at the normal printing site of the pad printing machine, such as positioned by a jig 585, and a thermal printing ink transfer 514 is indexed over the part before the assembly 500 comprising the heated flexible heat transfer die 505 is pressed onto it to transfer the indicia 514 into the surface of the part 565. A pick and place machine may be utilized for moving the parts 565 to be decorated, provided they are not oversized. The transfers 514 may be indexed from a roll 513 of transfers. The pad printing machine 575 cycles between:

a first position with the die raised above the plastic part;
    a second position with the die raised above the hot plate;
    a third position with the die in contact with the hot plate;
    the second position again with the die raised above the hot plate;
    the first position again with the die raised above the plastic part; and
    a forth position with the die in contact with the plastic part, compressed on it, and in some instances conformed around it, with the indexed thermal transfer positioned between the part and the heated die.

Repeating this cyclical process in accordance with the single-cycle process ensures the externally heated flexible heat transfer die is reheated each time and maintained at about 400-425° F. (204-218° C.) prior to engaging in the hot-stamping of indicia.

This cyclical process in accordance with the single-cycle process is the same when using an integrated flexible heat transfer die in place of assembly 500. The cycles still include the repeated contact of the assembly with the hot plate except that the TIM portion being heated is an integral part of the transfer pad rather than a part of an article draped around the transfer pad.

In the dual-cycle process, this same automation can be implemented, except possibly for the step of removing the carrier sheet prior to the fusion step. Thus, a pad printing machine may be used to cycle between:

a first position with the die raised above the plastic part;
    a second position with the die raised above the hot plate;
    a third position with the die in contact with the hot plate;
    the second position again with the die raised above the hot plate;
    the first position again with the die raised above the plastic part;
    a forth position with the die in contact with the plastic part, compressed on it, with the printing ink thermal transfer sheet having the fixative adhesive on the indicia side positioned between the part and the pad, indicia/adhesive side toward the part;
    the first position again with the die raised above the plastic part;
    an intervening step (manual or automated) comprising removal of the carrier sheet from the plastic part leaving the indicia behind on the plastic part;
    the second position again with the die raised above the hot plate;
    the third position again with the die in contact with the hot plate;
    the second position again with the die raised above the hot plate;
    the first position again with the die raised above the plastic part; and
    the forth position again with the die in contact with the plastic part, compressed on the indicia to fuse the indicia into the surface of the plastic part.

In this automated process, the flexible heat transfer die may be maintained at about 300-350° F. (149-177° C.) by repeated contact with the hot plate as described. This dual-cycle process may be streamlined by implementing a "two-head machine" comprising two assemblies, each comprising a transfer pad covered with a flexible heat transfer die. In the two-head machine, one assembly would be dedicated to transferring adhesive coated indicia to the surface of the part, whereas the second assembly would be dedicated to fusing the indicia ink into the surface of the part. The parts could move in an assembly line fashion from under the first assembly to under the second assembly. The part may stop between the heads for a time sufficient for the operator to peel off the carrier sheet from the part.

Materials:

Materials used in the various examples include the following:

P-THERM® PS-1545 Thermally Conductive Gap Filler from Polymer Science, Inc., Monticello, Ind.:

This material is a silicone-based thermally conductive gap filler, provided in sheet form with a thickness ranging from 0.25 mm to 5.0 mm. For use herein, the 1 mm or 2 mm sheet can be used, which is cut into the desired size, e.g., 100 mm×50 mm. This material has a thermal conductivity of 5.0 W/m-K, and a durometer Shore 00 hardness of 45, indicating the material is soft and malleable. Although the product is indicated as having a Fiberglas® carrier within, additional reinforcement is applied to this material according to the present disclosure.

3M® Thermally Conductive Interface Pads 5516 and 5516S, from the 3M Company, Maplewood, Minn.:

These pads are available thicknesses ranging from 0.5 to 2 mm. For use herein, the 2 mm thick sheet can be used, which is cut into the desired size, e.g., 100 mm×50 mm. This material has a thermal conductivity of 3.1 W/m-K, and a durometer Shore 00 hardness of 50 (for 5516) and 72 (for 5516S). The compression versus stress curve for 1 mm thick 3M 5516 shows that with about 4 MPa stress (about 580 psi), the pad will be 100% compressed.

EGel3100 Thermally Conductive Silicone Gel, from ACC® Silicones Ltd., Somerset, UK:

This material is a 2-component curable thermally conductive silicone elastomeric gel that is used herein for filling in recesses cut into a support material to make a flexible heat transfer die. The flowable nature of this material prior to curing makes it amenable for filling intricate recesses laser-cut into a support pad, such as lettering or other indicia cut into a silicone rubber sheet. Once cured for 7-days at 23° C./65% RH, this material has a durometer Shore 00 hardness of 45 and a thermal conductivity of 1.55 W/m-K. In various embodiments herein, this material is used to fill in recesses cut to a depth of about 1 mm to about 3.175 mm (⅛ inch).

⅛-Inch Thick 60 A Durometer Silicone Rubber Sheet, from Rubber-Cal, Inc., Santa Ana, Calif., and Other Suppliers:

This material provides a flexible reinforcement to a portion of TIM, e.g., by acting as a backing to the TIM and/or a surrounding to the TIM. An opening or recess may be cut into the silicone rubber sheet and the opening or recess filled in with the curable EGel3100 material of other suitable thermally conductive gel. In other examples, the opening may be filled in by the appropriately sized cut sheet of TIM pad or PS-1545 gap filler sheet material. The 60 A durometer silicone rubber sheet is devoid of thermal conductivity and, for purposes herein, is used as thermal insulation and structural reinforcement. In various embodiments, silicone rubber sheeting may be cut into appropriate shapes and used to block heat transfer from a portion of TIM.

TACONIC® PTFE and Silicone Rubber Coated Fabrics, from Taconic, Inc., Petersburgh, N.Y.:

These fabrics provide flexible reinforcement to a portion of TIM without insulating the thermal transfer from the TIM. These materials are essentially lightweight scrims with little electrical or thermal insulative capabilities. Of use herein are the mechanical grade materials having thicknesses ranging from 0.0025 inches (0.06 mm) to 0.0115 inches (0.3 mm). The mechanical grade fabrics are Fiberglas reinforced PTFE having a medium coating of PTFE. In various embodiments, two sheets of PTFE coated Fiberglas fabric are bonded to each side of a sheet of TIM, such that the TIM is sandwiched between the fabric layers and structurally reinforced. The bonding between the fabric sheets around the periphery of the TIM may be accomplished by applying an FEP adhesive between the layers and hand welding the laminate stack together.

Vulcanized RTV Silicone Rubber, from Wacker Chemie, AG, Adrian, Mich., Amongst Other Suppliers:

This material is a room temperature vulcanizing silicone used herein as a structural material for supporting TIM within a flexible heat transfer die. This silicone rubber is available as a 1-part (RTV-1) or 2-part (RTV-2) composition, both compositions curing into an elastomer. This silicone rubber has a durometer hardness of from about 15 to about 40 Shore A once cured and is insulative.

Example 1: Flexible Heat Transfer Die Comprising Fabric Reinforced TIM Pad Portion As illustrated in FIGS. 1A and 1B and explained in general embodiments above, a sheet of 2 mm thick thermally conductive silicone interface pad (3M® 5516 TIM pad, or equivalent) was cut into rectangle 110 measuring about 3 inches (76 mm)×6 inches (152 mm). The TIM material 110 was placed lengthwise and centered on a strip of 0.0040 inch (0.1 mm) thick mechanical grade Fiberglas® reinforced Teflon® fabric (Taconic® 7057 or equivalent) 101a measuring about 6 inches (152 mm)×12 inches (305 mm). Around the periphery of the rectangular piece of TIM was placed an FEP (fluorinated ethylene propylene) lamination adhesive, and another 6×12 inch (152×305 mm) strip of Fiberglas® reinforced Teflon® fabric 101b was laid over top, aligning with the strip of fabric underneath. The three-layer stack was then laminated by hand welding to create the flexible heat transfer die 100 as shown in FIG. 1B. As shown in FIG. 4, this thin laminated article was then draped around the contact side of a loaf-shaped transfer pad 460 and secured along each long edge of the wood base 465 of the transfer pad using metal strips 425 and screws 426. The laminate-style flexible heat transfer die was successfully used in assembly 400 and attached to a pad printing machine (e.g., FIG. 5) for at least 500 cycles for the transfer of indicia onto a hollow handle of a molded plastic article before showing signs of wear. The hot plate of the modified pad printing machine was kept at 425° F. (218° C.), bringing the flexible heat transfer die 100 to about 400° F. (204° C.) once a steady state condition was achieved. Examples of transferring indicia onto an uneven/curved surface is shown in FIG. 5.

In certain variations, one or more cut pieces of insulating silicone rubber or other sheeting or film can be used to block heat transfer from the die in selected places, such as outside the outer periphery of a graphics design, as shown in FIGS. 2A and 2B.

Example 2: Flexible Heat Transfer Die Comprising Silicone Pad Reinforced TIM Material—Window Format A 60 A hardness silicone pad measuring ⅛-inch (3 mm) thick and about 6×12 inch (152×305 mm) was cut with a blade to provide a window through the pad measuring about 2 inches (51 mm) by 4 inches (102 mm). The rectangular window was cut such that the longer edges of the window were parallel to the longer edges of the silicone pad. The pad was clamped to a level surface and the window filled with a two-component room temperature cure in place thermally conductive silicone elastomer gel (e.g., EGel3100 or equivalent). The TIM gel was filled into the window to the thickness of the silicone pad. After curing, the pad was removed from the clamps. One side of the filled pad was then covered with a thin layer of curable RTV vulcanized silicone rubber adhesive, over the TIM portion and onto a portion of the silicone pad. After curing of the RTV adhesive, a flexible heat transfer die was produced. This externally heated flexible heat transfer die was then draped around the contact side of a loaf-shaped transfer pad and pinned along each long edge into the wood base of the transfer pad using thumbtacks or strips of metal secured with screws, thus appearing similar to assembly 400 as illustrated in FIG. 4. The silicone pad-style flexible heat transfer die was successfully used in a pad printing machine such as apparatus 575 in FIG. 5 for at least 500 cycles for the transfer of indicia onto a hollow handle of a molded plastic article before showing signs of wear. The hot plate was kept at 425° F. (218° C.), bringing the flexible heat transfer die to about 400° F. (204° C.) once a steady state condition was achieved.

Example 3: Flexible Heat Transfer Die Comprising Silicone Pad Reinforced TIM Material—Intricate Graphics Format With reference now to FIG. 3, a 60 A hardness silicone pad 314 measuring ⅛-inch (3 mm) thick and about 6×12 inch (152×305 mm) was etched by laser ablation to produce recesses in the pad in the form of a string of letters in a graphics design font 312 with the lettering measuring about 2 inches (51 mm) by 4 inches (102 mm) overall. The ablation was adjusted to create the design at a depth of about 1 mm into the pad. The lettering was arranged such that it ran in the longer direction of the pad. The lettering was then filled in with a two-component room temperature cure in place thermally conductive silicone elastomer gel (e.g., EGel3100 or equivalent). The TIM gel was filled into the recesses forming the lettering to be even with the top surface of the silicone pad. After curing, laser ablation was used to level the top surfaces of the lettering 312 and to planarize any inconsistent heights produced by curing the TIM filled in the intricate recesses. Also, the top surface of the pad around the lettering was laser ablated to leave behind a raised rectangular shaped island 315 around the lettering, measuring a little larger than the 2 inches (51 mm) by 4 inches (102 mm) lettering.

After laser ablating the surface in this way, the flexible heat transfer die 300 was produced, the finished die appearing as illustrated in FIG. 3. This flexible heat transfer die 300 was then draped around the contact side of a loaf-shaped transfer pad (as illustrated generally in FIG. 4) and pinned along each long edge into the wood base of the transfer pad using thumbtacks or strips of metal secured with screws. The silicone pad-style flexible heat transfer die 300 was successfully used in an assembly 400 as per FIG. 4 in a modified pad printing machine having a hot plate (e.g., FIG. 5) for at least 500 cycles of indicia transfer onto a hollow handle of a molded plastic article before showing signs of wear. The hot plate of the modified pad printing machine was kept at 425° F. (218° C.), bringing the flexible heat transfer die to about 400° F. (204° C.) once a steady state condition was achieved.

Example 4: Flexible Heat Transfer Die Comprising Teflon® or Kapton® Thin Film Reinforced TIM Pad Portion A sheet of 2 mm thick thermally conductive silicone interface pad (3M® 5516 TIM pad, or equivalent) was cut into a rectangle measuring about 3 inches (76.2 mm)×6 inches (152.4 mm). The TIM material was placed lengthwise and centered on a strip of 3 mil (0.003-inch, 0.08 mm) thick Teflon® or Kapton® film measuring about 6 inches×12 inches (152×305 mm). An adhesive was applied around the periphery of the rectangular piece of TIM and out to the edges of the film and another 6-inch×12-inch (152×305 mm) strip of 3 mil (0.08 mm) Teflon® or Kapton® film was laid over top, aligning with the film layer underneath. The three-layer stack was then laminated by hand welding to create the flexible heat transfer die. This thin laminate was then draped around the contact side of a loaf-shaped transfer pad and pinned along each long edge into the wood base of the transfer pad using thumbtacks or strips of metal secured with screws. The laminate-style flexible heat transfer die was successfully used in a pad printing machine for at least 500 cycles for the transfer of indicia onto a hollow handle of a molded plastic article before showing signs of wear. The hot plate was kept at 425° F. (218° C.), bringing the flexible heat transfer die to about 400° F. (204° C.) once a steady state condition was achieved.

Example 5: An Integrated Flexible Heat Transfer Die Comprising Silicone Rubber Molded Around a TIM Portion The TIM portion shown in FIGS. 8A-8C, (or portions having small design variations) was molded from a liquid silicone potting compound having viscosity of 6,000 cps, specific gravity of 1.63, an after-cure durometer hardness of 45 A (45 on the Shore A scale), elongation of 240%, tensile strength of 250 psi (1.72 MPa), and an after-cure thermal conductivity of 2.5 W/m-K. As mentioned, design variations can be introduced in the multipiece mold used to cast the TIM portion, so long as sufficient features are provided to help retain the TIM portion in the molded integrated heat transfer die. The article shown in FIGS. 8A-8C was fixed to the bottom of the mold shown in FIG. 9 using petroleum jelly (e.g. Vaseline®). With the TIM portion thus fixed to the surface of the mold, a curable silicone rubber having an after-cure durometer hardness of 60 A was poured into the mold and a piece of wood was placed on the top of the mold. After curing and removal from the mold, the integrated flexible heat transfer die appeared as illustrated in FIG. 10, wherein the exposed surface of the TIM portion was contiguous with the contours of the contact side of the cast article.

Methods, apparatus and system for decorating plastic articles having uneven surfaces or hollow structures are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for a composition or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

We claim:

1. A heat transfer die comprising:
a flexible transfer pad; and
a thermal interface material (TIM) portion positioned over the flexible transfer pad, wherein the TIM portion is configured to interface with a thermal printing ink transfer.

2. The heat transfer die of claim 1, wherein the flexible transfer pad comprises a block of cured silicone rubber.

3. The heat transfer die of claim 1, further comprising a reinforcement material in contact with the TIM portion.

4. The heat transfer die of claim 1, further comprising a reinforcement material in contact with the TIM portion, wherein the reinforcement material dimensionally constrains the TIM portion in at least two directions.

5. The heat transfer die of claim 1, further comprising a reinforcement material in contact with the TIM portion, wherein the reinforcement material comprises a cured block of elastomeric polymer at least partially encasing the TIM portion.

6. The heat transfer die of claim 1, further comprising a reinforcement material in contact with the TIM portion, wherein the reinforcement material is selected from the group consisting of fabric, a silicone rubber pad, a cured elastomeric polymer, RTV vulcanized silicone rubber adhesive, polytetrafluoroethylene film, poly-oxydiphenylene-pyromellitimide film, and combinations thereof.

7. The heat transfer die of claim 1, further comprising a reinforcement material in contact with the TIM portion, wherein the reinforcement material comprises two portions of any combination of reinforced fabric sheet, polytetrafluoroethylene film, and poly-oxydiphenylene-pyromellitimide film, laminated together such that the TIM portion is disposed between the two portions of reinforcement material.

8. The heat transfer die of claim 1, wherein the TIM portion comprises at least one of a sheet of thermally conductive silicone interface pad or a portion of cured thermally conductive silicone elastomeric gel.

9. The heat transfer die of claim 1, wherein the TIM portion at least one of is contained within a window cut in a silicone rubber pad, is contained within recesses etched into a surface of the silicone rubber pad or comprises a protrusion having an undercut surface under which a cured block of elastomeric polymer resides to hold the TIM portion within the heat transfer die.

10. The heat transfer die of claim 1, wherein the TIM portion has a durometer hardness of from about 30 Shore 00 hardness up to about 60 Shore A hardness, a thermal conductivity of from about 0.5 W/m-K to about 50 W/m-K, and a thickness of from about 1 mm to about 10 mm.

11. The heat transfer die of claim 1, further comprising an electrical heater disposed at least one of in contact with or in close proximity to the TIM portion, such that the electrical heater is capable of heating the TIM portion to a temperature of from about 300° F. (149° C.) to about 475° F. (246° C.) and maintaining such temperature.

12. The heat transfer die of claim 1, further comprising:
a heated assembly movable by an apparatus from a position in contact with a heat source to a position compressed against a surface of a plastic article, the heated assembly comprising the flexible transfer pad having a contact side and a platform base opposite the contact side; and
a flexible heat transfer die draped around the contact side of the flexible transfer pad,
wherein the heat source is maintained at a temperature sufficient to heat a portion of the TIM portion dimensionally contained in a reinforcement material present in the flexible heat transfer die, to a steady state temperature upon repeated contact of the heated assembly with the heat source, and
wherein the indicia from the thermal printing ink transfer is transferred to the surface of the plastic article when the heated assembly is compressed against the surface of the plastic article while the thermal printing ink transfer is disposed between the heated assembly and the plastic article.

13. The heat transfer die of claim 12, wherein the thermal printing ink transfer comprises a roll of duplicative indicia transfers, and wherein an indexing machine indexes each transfer into position over the surface of the plastic article prior to compression of the heated assembly against the surface of the plastic article.

* * * * *